United States Patent
Rike

(10) Patent No.: US 11,585,297 B2
(45) Date of Patent: Feb. 21, 2023

(54) FUEL MODULE SYSTEM

(71) Applicant: WORTHINGTON INDUSTRIES, INC., Columbus, OH (US)

(72) Inventor: James B. Rike, Mooresville, IN (US)

(73) Assignee: WORTHINGTON INDUSTRIES INC., Columbus, OH (US)

( * ) Notice: Subject to any disclaimer, the term of this patent is extended or adjusted under 35 U.S.C. 154(b) by 35 days.

(21) Appl. No.: 16/136,646

(22) Filed: Sep. 20, 2018

(65) Prior Publication Data
US 2019/0085791 A1 Mar. 21, 2019

Related U.S. Application Data

(60) Provisional application No. 62/561,548, filed on Sep. 21, 2017.

(51) Int. Cl.
*F02M 21/02* (2006.01)
*F02D 19/06* (2006.01)
(Continued)

(52) U.S. Cl.
CPC ... *F02M 21/0239* (2013.01); *B60K 15/03006* (2013.01); *F02D 19/027* (2013.01); *F02D 19/0628* (2013.01); *F02D 19/0647* (2013.01); *F02M 21/0206* (2013.01); *F02M 21/029* (2013.01); *F02M 21/0212* (2013.01); *F02M 21/0215* (2013.01); *F02M 21/0221* (2013.01); *F02M 21/0227* (2013.01); *F02M 21/0242* (2013.01); *F02M 21/0245* (2013.01);
(Continued)

(58) Field of Classification Search
CPC ....... F02M 21/00–12; F02M 35/10216; F02M 37/0029; F02M 37/0052; F02M 37/46; F02M 69/54; F02D 19/02–029; F23K 5/002–007; F23K 5/18; F23K 2301/202; B01D 35/005; B01D 23/00–18
USPC ................ 123/527, 457, 458, 511, 525–529
See application file for complete search history.

(56) References Cited

U.S. PATENT DOCUMENTS 4,492,208 A * 1/1985 Lent ...................... F02M 21/06
123/195 A
5,887,572 A * 3/1999 Channing ............... F02M 31/20
123/510

(Continued)

FOREIGN PATENT DOCUMENTS

| EP | 1715400 | 10/2006 |
|----|---------|---------|
| WO | 2016172177 | 10/2016 |
| WO | 2017075205 | 5/2017 |

OTHER PUBLICATIONS

European Search Report and Information on Search Strategy; Appl. No. EP18196048.5; Dated Aug. 3, 2019.

*Primary Examiner* — Robert A Werner
(74) *Attorney, Agent, or Firm* — Tucker Ellis LLP

(57) ABSTRACT

A fuel module system is provided. The fuel module system can be mounted on a chassis of a vehicle and deliver a material from a container to an engine at a regulated pressure and a target temperature for optimization of the vehicle. The flow of material can be from the one or more containers to the fuel module system and then to a portion of the engine, wherein the material housed within the one or more containers has a first temperature, a first pressure, and a first flow rate and at the delivery to the portion of engine, the material is adjusted by the fuel module system.

15 Claims, 15 Drawing Sheets

(51) Int. Cl.
  *B60K 15/03* (2006.01)
  *F02D 19/02* (2006.01)
  *F02M 37/46* (2019.01)

(52) U.S. Cl.
  CPC ... *F02M 37/46* (2019.01); *B60K 2015/03013* (2013.01); *B60K 2015/03026* (2013.01); *B60K 2015/03315* (2013.01); *B60Y 2200/142* (2013.01)

(56) References Cited

U.S. PATENT DOCUMENTS

| | | | | |
|---|---|---|---|---|
| 5,913,239 A * | 6/1999 | Morris, Jr. | | F02D 41/18 73/114.32 |
| 6,041,762 A * | 3/2000 | Sirosh | | B60K 15/013 123/529 |
| 6,345,611 B1 * | 2/2002 | Hartman | | F02M 31/10 123/3 |
| 9,359,963 B2 | 6/2016 | Pursifull | | |
| 2002/0083980 A1 * | 7/2002 | Nakajima | | G05D 16/0663 137/505.41 |
| 2002/0166545 A1 * | 11/2002 | Stone | | F01N 5/02 123/527 |
| 2009/0211559 A1 * | 8/2009 | Appleton | | F02D 41/38 123/511 |
| 2012/0304969 A1 * | 12/2012 | Young | | F02D 41/0025 123/480 |
| 2014/0090723 A1 * | 4/2014 | Toale | | F02M 21/0239 137/487.5 |
| 2014/0174404 A1 | 6/2014 | Coldren | | |
| 2015/0120166 A1 * | 4/2015 | Fisher | | B61C 17/02 701/101 |
| 2015/0159564 A1 * | 6/2015 | Wildgrube | | B60K 15/013 180/69.5 |
| 2015/0233310 A1 * | 8/2015 | Zhang | | F02D 19/06 701/54 |
| 2016/0317959 A1 * | 11/2016 | Falc'Hon | | B01D 35/153 |
| 2018/0135538 A1 * | 5/2018 | Ehlig | | F02M 21/0239 |
| 2018/0223746 A1 * | 8/2018 | Mack | | F02D 35/0015 |

* cited by examiner

FUEL MODULE SYSTEM

CROSS-REFERENCE TO RELATED APPLICATIONS

This application claims priority to and the benefit of U.S. Application Ser. No. 62/561,548 filed on Sep. 21, 2017 having the title FUEL MODULE SYSTEM. The entirety of which is incorporated herein by reference.

BACKGROUND

Technical Field

Embodiments of the subject matter disclosed herein relate to a fuel module system for a vehicle, wherein an engine of the vehicle utilizes an alternative fuel as a fuel source, and in some examples a compressed gas as a fuel source. Some embodiments are directed to a fuel module system for a vehicle that utilizes an alternative fuel stored in a container as a fuel source, wherein the vehicle can utilize a combustible fuel engine, a battery powered engine, or a combination thereof.

Discussion of Art

It may be desirable to have an alternative fuel system and method that differs from those systems and methods that are currently available.

BRIEF DESCRIPTION

In an embodiment, a vehicle is provided that includes at least the following: a fuel storage system that encases at least one container; the container houses a compressed gas, the container has a first end and a second end opposite thereto; a fuel module system that receives the compressed gas from the container and reduces a pressure of the compressed gas and manages a temperature of the gas prior to deliver to an engine; and the engine receives the compressed gas from the fuel module system at the pressure and the temperature.

In an embodiment, a fuel module system that is in fluid communication between an engine and a container that houses a compressed gas is provided that includes: an inlet that is in fluid communication with a container that houses a compressed gas and the inlet is configured to receive the compressed gas at a first pressure from the container; a first filter in fluid communication with the inlet and is configured to filter the compressed gas; a regulator that is in fluid communication with the first filter and is configured to adjust the first pressure of the compressed gas to a second pressure after the compressed gas is filtered, wherein the second pressure is lower than the first pressure and is within a predefined range of values for an engine based on a size of the engine and a number of pistons of the engine; a gas path in fluid communication with the regulator configured to receive the compressed gas at the second pressure, the gas path directs the compressed gas to a second filter; the second filter is in fluid communication to the gas path and is configured to filter the compressed gas; and an outlet that is configured to deliver the compressed gas from the second filter to the engine, the outlet is in fluid communication with a portion of the engine for receipt of the compressed gas at the second pressure.

In an embodiment, a fuel module system is provided that is in fluid communication between an engine and a container that houses a compressed gas and includes: an inlet in fluid communication with a container that houses a material used as an alternative fuel for a vehicle; an outlet in fluid communication with a combustion chamber for the engine of the vehicle; a first pressure sensor that detects a first pressure of the material prior to being delivered to the inlet; a first temperature sensor that detects a first temperature of the material prior to being delivered to the inlet; a first flow sensor that detects a first flow rate of the material prior to being delivered to the inlet; a regulator that adjusts the first pressure of the material to a second pressure that is within a target range for pressure dependent on a displacement of an engine; the regulator further adjusts the first flow rate of the material to a second flow rate that is within a target range for a flow rate that is dependent on the displacement of the engine; one or more lines that adjusts a temperature of a body of the fuel module system to change the first temperature of the material to a second temperature that is within a target range for a flow rate that is dependent on the displacement of the engine; a first filter that removes contaminants from the material prior to receipt at the regulator; and a second filter that removes contaminants from the material after the regulator adjusts at least one of the first pressure or the flow rate.

These and other objects of this invention will be evident when viewed in light of the drawings, detailed description and appended claims.

BRIEF DESCRIPTION OF THE DRAWINGS

Reference is made to the accompanying drawings in which particular embodiments and further benefits of the provided subject matter are illustrated as described in more detail in the description below.

DETAILED DESCRIPTION

Figure 1:
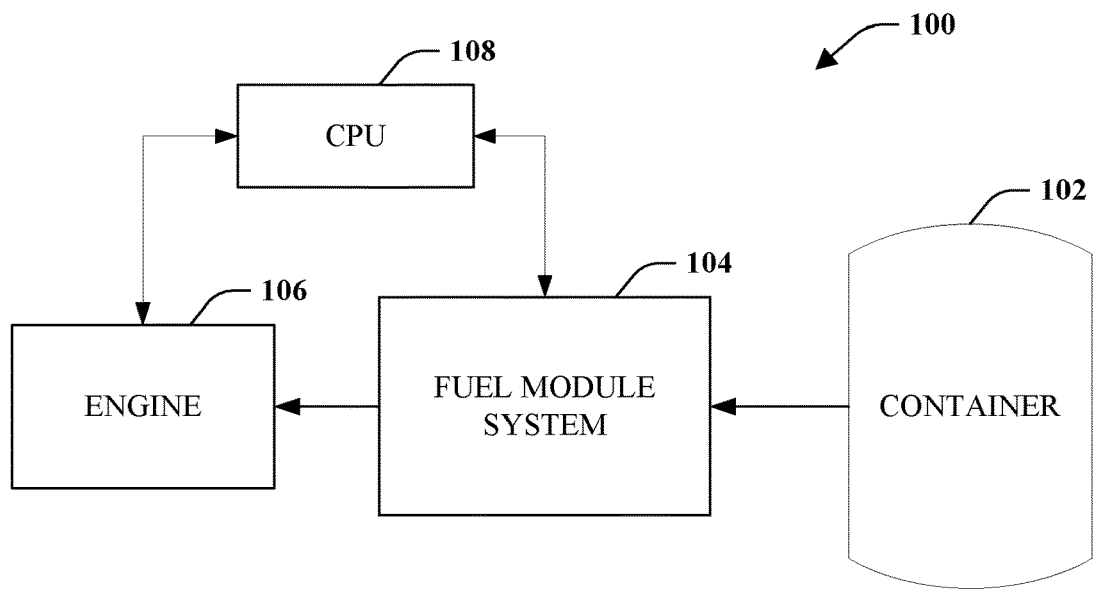
FIG. 1 is a block diagram of a system that is configured to deliver a material from a container to a fuel module system and to an engine.

Embodiments of the provided subject matter relate to methods and systems for a fuel module system for a vehicle. The fuel module system can receive a material from one or more containers, wherein each container can house or store a material for a fuel source for a vehicle. The material can be used as a fuel source for a combustible fuel engine, an alternative fuel, or a fuel to power a device that powers or charges a battery used for the vehicle. In an embodiment, the material housed can be a compressed gas. In another embodiment, the material housed by the container can be natural compressed gas (CNG) but is not so limited.

The material housed within the one or more containers can pass through the fuel module system and be adjusted for delivery and use by the engine of the vehicle. The flow of material can be from the one or more containers to the fuel module system and then to a portion of the engine, wherein the material housed within the one or more containers has a first temperature, a first pressure, and a first flow rate at the delivery to the portion of the engine, the material is adjusted by the fuel module system to have a second temperature, a second pressure, and a second flow rate that are optimized for the engine based on one or more manufacturing requirements.

The one or more containers can house a portion of material and such containers can be vertically oriented, horizontally oriented, or in a position in-between horizontal and vertical (in comparison to the ground). Moreover, the containers can be behind a cab of a vehicle, below a cab of a vehicle, or a combination thereof. The fuel module system can further include electrical and/or mechanical connective means in order to provide electrical and/or mechanical connectivity between the fuel module system and the vehicle and/or a computer processing unit (CPU) of the vehicle and the fuel module system.

The one or more containers can be within a casing or compartment that can be affixed, attached, or removeably coupled to a portion of the vehicle. For instance, the casing or compartment can be referred to as a fuel storage system and can be removeably coupled to a chassis of the vehicle, a cab of a vehicle, a chassis of a trailer that is attachable to a vehicle, or a combination thereof. It is to be appreciated that the fuel module system can be positioned in various locations on the vehicle. By way of example and not limitation, the fuel module system can be at least one of within the engine compartment of the vehicle, coupled to a portion of the engine, proximate to the engine, coupled to a chassis of the vehicle proximate to the one or more containers or the engine, coupled to a portion of the fuel storage system or included within the fuel storage system, contained within a casing that houses the one or more containers, incorporated into the fuel storage system, incorporated into the engine, incorporate into the container, or a combination thereof.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "vehicle" as used herein may be a mobile machine or a moveable transportation asset that transports at least one of a person, people, or a cargo. For instance, a vehicle can be, but is not limited to being, a semi, a semi-truck, a semi-trailer truck, a tractor-trailer, a transfer truck, an 18-wheeler, a truck, a class 8 vehicle, an automobile, farm equipment, industrial equipment, construction equipment, a van, a Sport Utility Vehicle (SUV), a truck that carriers a load and/or freight, a cement truck, a delivery truck, a tractor, a flat-bed truck, a bus, and the like. Moreover, a vehicle can be powered by combustible fuel (e.g., unleaded fuel, diesel fuel, compressed natural gas, compressed hydrogen, compressed gas, alternative fuel, among others) or a battery or electric motor. The term "container" as used herein can be defined as any cylinder, tank, housing, canister, and the like of any suitable material that can house or contain at least one of alternative fuels, renewable fuel sources, nonrenewable fuel sources, liquid fuel sources, or gas fuel sources.

FIG. 1 illustrates a system 100 that is configured to deliver a material from a container 102 to a fuel module system 104, wherein the fuel module system 104 manages the delivery of the material to an engine 106. The fuel module system 104 can communicate with a computer processing unit (CPU) 108 (herein referred to as "CPU 108") such that data collected by the CPU 108 can be utilized by the fuel module system 104 and data collected by the fuel module system 104 can be utilized by the CPU 108. It is to be appreciated that the CPU 108 can be an engine control module (ECM), an engine control unit (ECU), and the like. The system 100 can be employed by a vehicle such as, but not limited to, a truck or a vehicle that consumes alternative fuels. In a particular embodiment, the vehicle can utilize a first fuel and a second fuel, wherein the first fuel is an unleaded or diesel fuel and the second fuel is an alternative fuel. The alternative fuel can be, but is not limited to, a compressed gas, a compressed natural gas, hydrogen, among others (as discussed in more detail below).

The fuel module system 104 can be in fluid communication with the container 102 with a supply line, wherein the supply line delivers the material from the container 102 at a first pressure (e.g., a high pressure). The supply line can run between the fuel module system 104 and the container 102 and/or a fuel storage system 28 (illustrated in FIGS. 14-20 and discussed below). It is to be appreciated that the supply line can be a flexible supply line or a solid conduit. The fuel module system 104 can be in fluid communication with the container 102 from which material can be received. Additionally, the fuel module system 104 can be in fluid communication with a portion of the engine 106 to deliver material that is processed by the fuel module system 104, wherein the processing can include, but is not limited to including, temperature adjustment, pressure adjustment, flow rate adjustment, or a combination thereof. Subsequent passing through the fuel module system 104, the material can be delivered to a portion of the engine 106 via tubing, plumbing, valves, connections, and the like. The portion of the engine 106 that receives the material can be, but is not limited to being, a combustion chamber, an intake manifold, or a component that delivers the material to a spark plug for compression and ignition.

It is to be appreciated that the engine 106 can include a target range for pressure, temperature, and flow rate (collectively referred to as "the target range parameters") based on at least one of, for instance, a manufacture specification, a type of engine, an engine displacement (e.g., size), a type of alternative fuel to be consumed by the engine 106, among others. The fuel module system 104 can adjust the material in the one or more containers having a first temperature, a first pressure, and a first flow rate to a second temperature, a second flow rate, and/or a second pressure such that the second temperature, the second flow rate, and the second pressure are at the target ranges for the engine 106. In another embodiment, the fuel module system 104 can adjust the first temperature, the first pressure, and the first flow rate to the second temperature, the second pressure, and the second flow rate to have a tolerance of variation from the target ranges or amounts. It is to be appreciated that the tolerance, variance, or thresholds for the target ranges of pressure, temperature, and flow rate can be chosen with sound engineering judgment without departing from the intended scope of coverage of the embodiments of the subject invention.

In addition, it is to be appreciated that the fuel module system 104 can optimize the material for delivery and use for the engine 106 based on, but not limited to, a crank position, a revolution per minute (RPM) of the engine 106, a speed of the vehicle, a terrain the vehicle is traveling on, an oxygen level or amount in the material, a fuel mapping for the vehicle, a boost or turbo boost related to the engine 106, a load the vehicle is towing or carrying, among others.

The target ranges for pressure, temperature, and flow rate (respectively) can be determined or ascertained based on an engine 106 or one or more parameters related to an engine 106 or vehicle. For instance, the target ranges as used by the fuel module system 104 to adjust the material in the container 102 can be, but are not limited to being, calculated from or defined by at least one of engine size, engine displacement, make/model of engine, horse power, combustion fuel consumption capabilities, torque of the engine, number of pistons, piston arrangement within the engine, piston size, spark plug type, combustion chamber size, combustion chamber volume, combustion chamber temperature, combustion chamber pressure, barometric pressure within the combustion chamber, barometric pressure outside the combustion chamber, manufacturer specification, transmission type and revolutions per minute (RPMs) of shifting gears, RPMs of the engine, turbo mechanism for the engine, or any combination thereof. It is to be appreciated that the target ranges can be calculated, derived, or received and/or such target ranges can be predefined or calculated in real-time. Moreover, the target ranges can be stored within at least one of a memory of the fuel module system 104, a stand-alone memory, a remote memory, a memory utilized by the vehicle (e.g., CPU 108, ECM, ECU, etc.), or a cloud memory. Moreover, the fuel module system 104 can receive predefined target ranges and adjust or modify such predefined target ranges based on readings or measurements from one or more sensors or the CPU 108 of the vehicle.

By way of example and not limitation, the fuel module system 104 can be positioned in a compartment where the engine 106 is housed, affixed on or proximate to the engine 106, on a frame of a vehicle, above a frame of the vehicle, below a frame of the vehicle, parallel to the frame of a vehicle, among others. In another embodiment, the fuel module system 104 can be affixed to a fuel storage system or within a fuel storage system 28 (where example fuel storage systems are shown in FIGS. 14-20). In another embodiment, the fuel storage system 28 can be retrofitted to a vehicle that utilizes one or more containers housing a material that is an alternative fuel. In such embodiment, the fuel storage system 28 can be coupled to a portion of the vehicle (e.g., within the engine compartment, onto the engine 106, proximate to the container 102, within a casing that encases the container 102, among others) to be in fluid communication between the one or more containers 102 and the engine 106 to provide delivery of the material from the container 102 to a portion of the engine 106. In such embodiment, the fuel storage system 28 can be in electronic communication with the engine 106 via at least one of a CPU 108, an ECM, an ECU, or a direct connection thereto (e.g., Society of Automotive Engineers standard SAE J1939 vehicle bus, among others) in order to adjust at least one of the temperature, pressure, or flow rate of the material from the one or more containers 102 prior to deliver to the portion of the engine 106.

Figure 5:
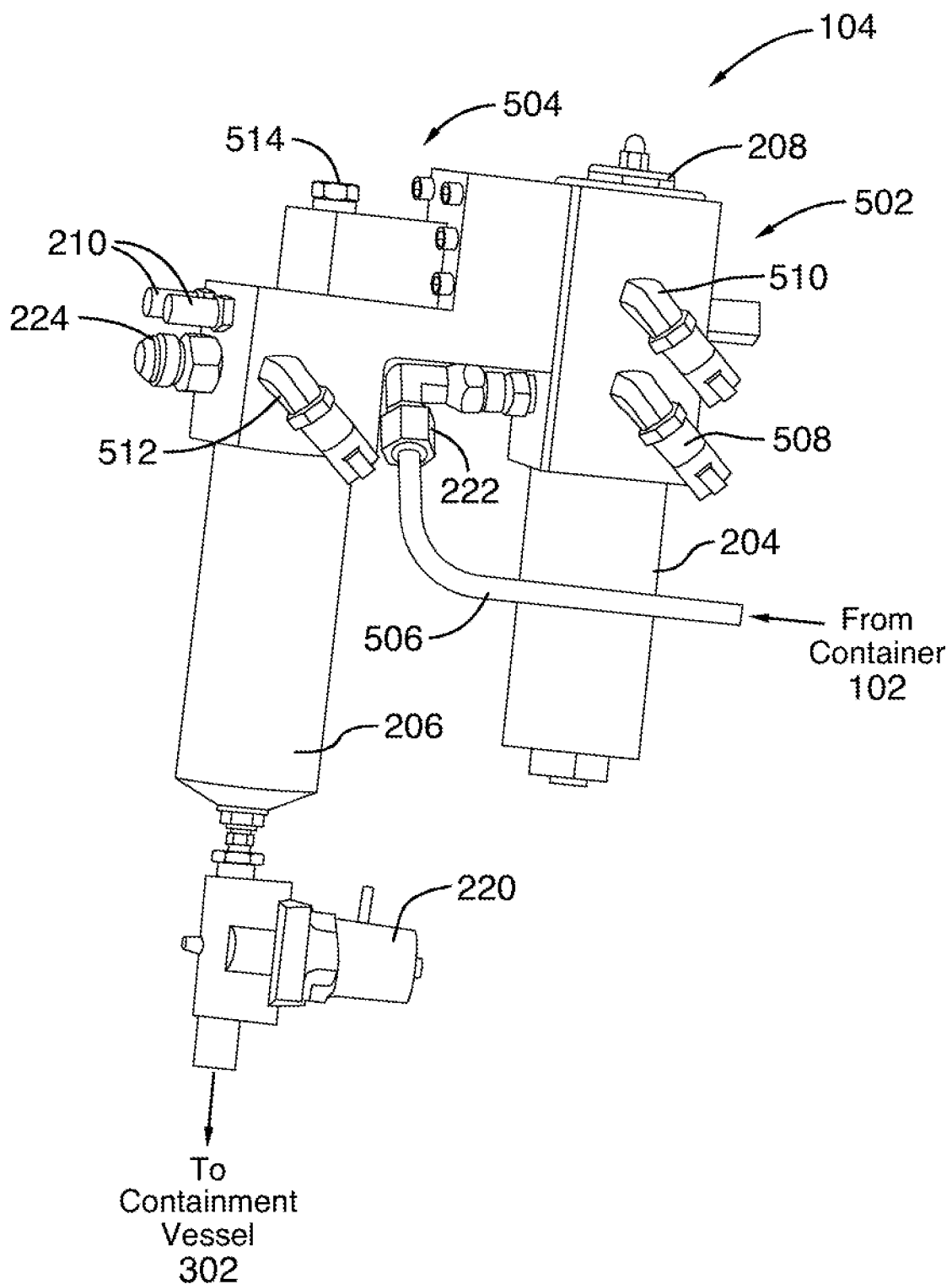
FIG. 5 is an illustration of a fuel module system.
Figure 6:
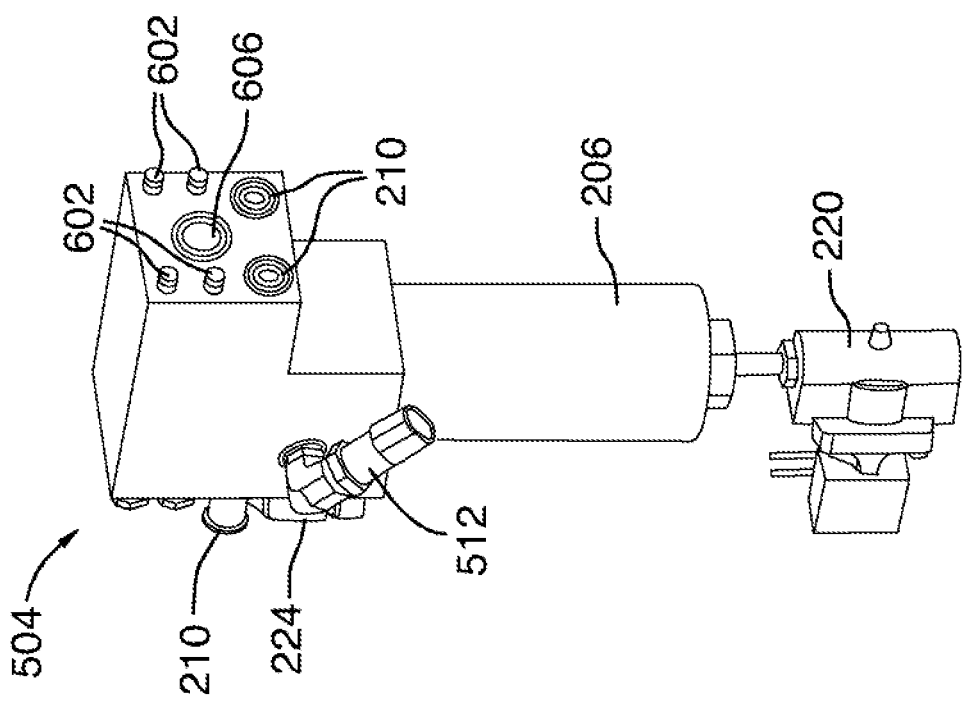
FIG. 6 is an illustration of a portion of a fuel module system.
Figure 11:
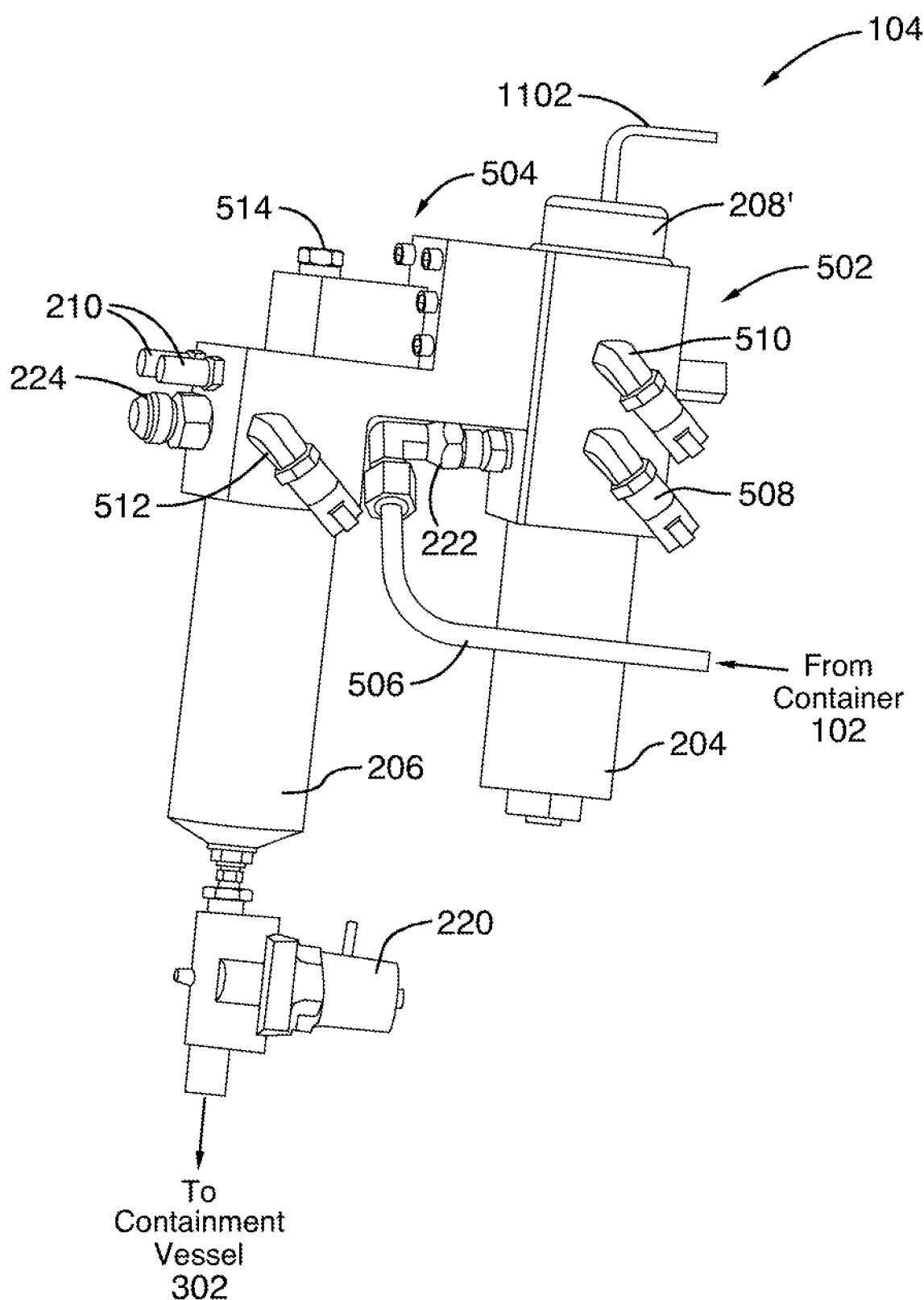
FIG. 11 is an illustration of a portion of a fuel module system.
Figure 12:
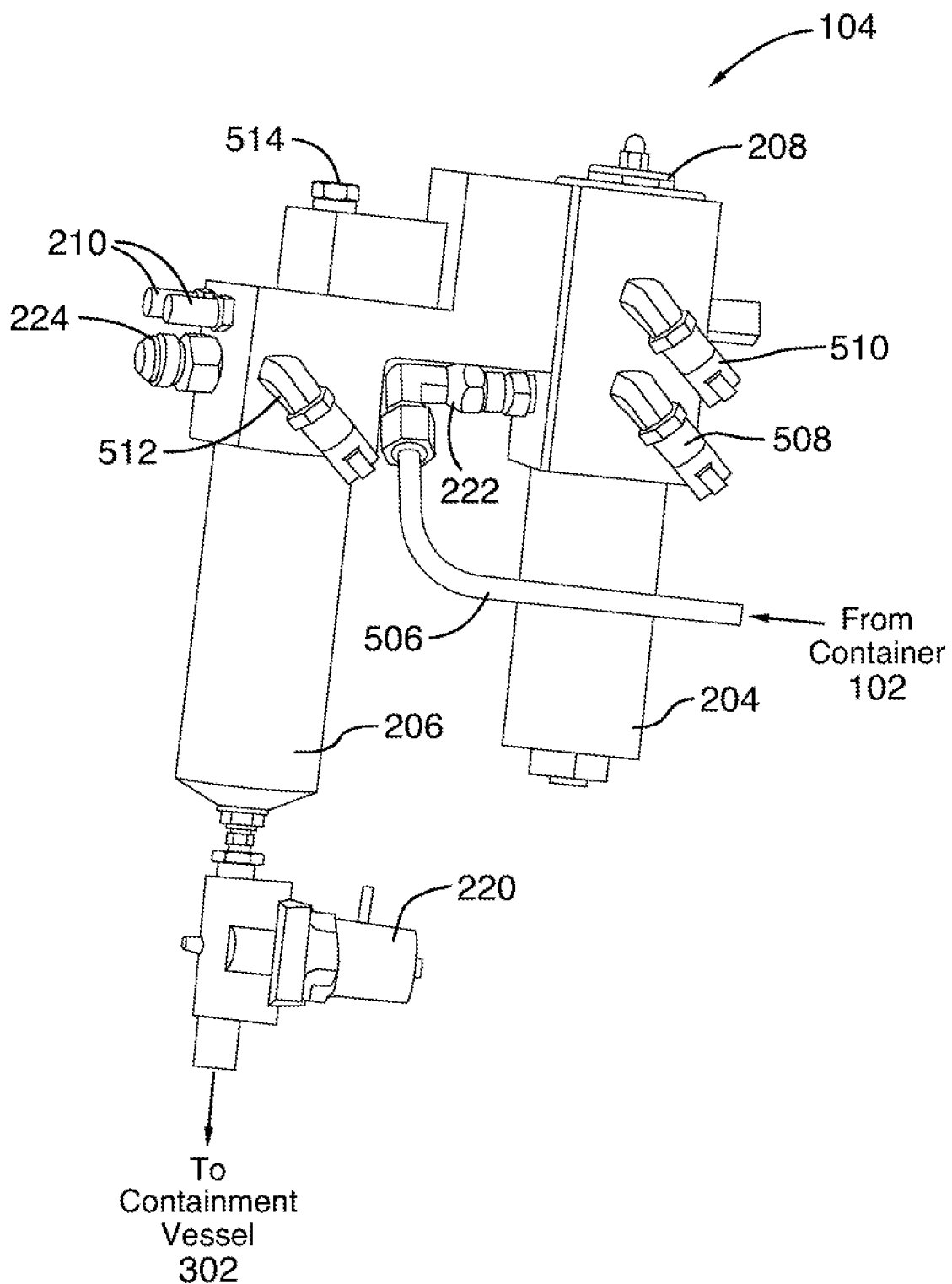
FIG. 12 is an illustration of a portion of a fuel module system.
Figure 13:
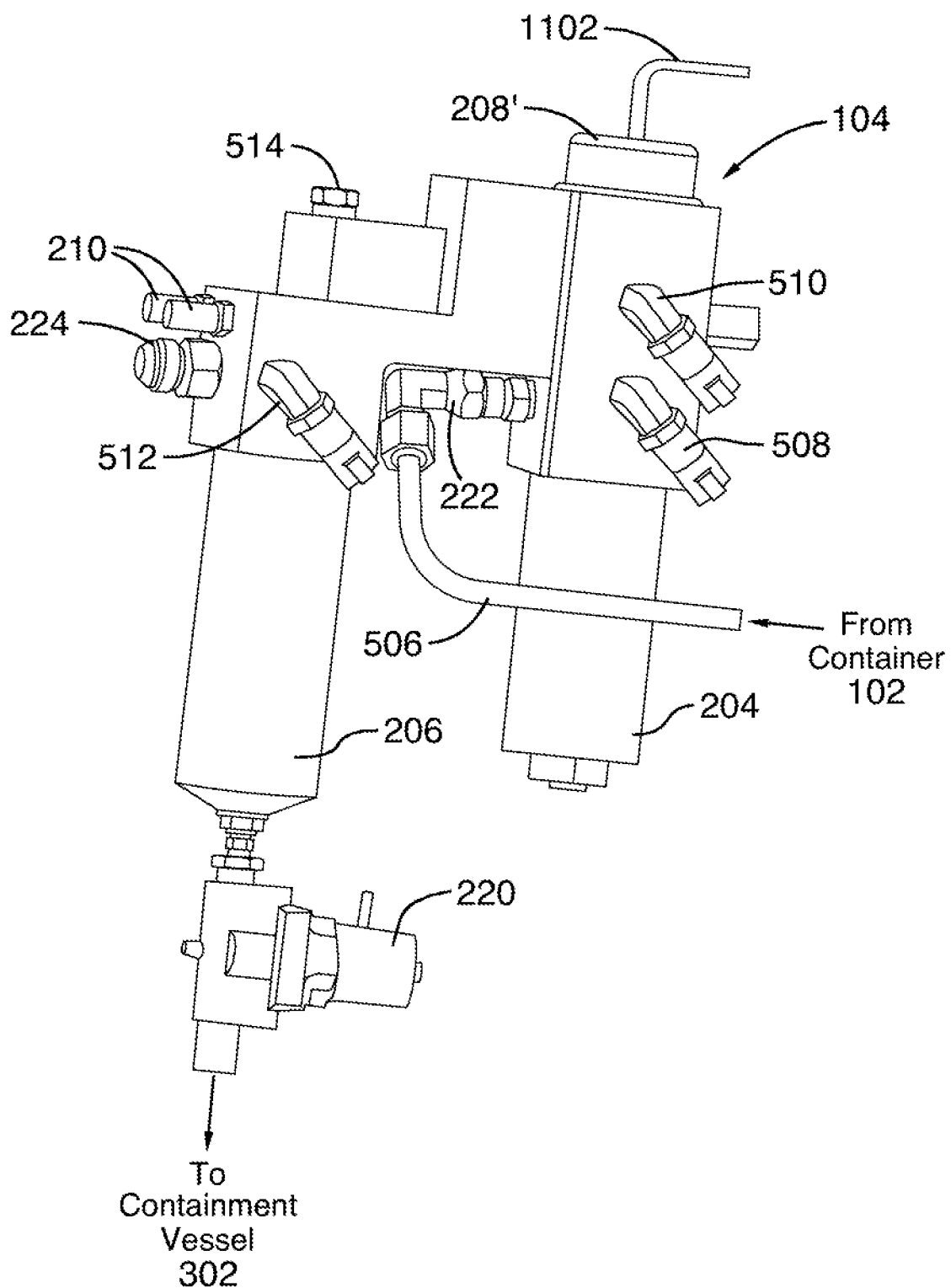
FIG. 13 is an illustration of a portion of a fuel module system.

In an embodiment, the fuel module system 104 can be a single unit (shown in FIGS. 12 and 13). In another embodiment, the fuel module system 104 can be one or more sectional modules (as shown in FIGS. 5, 6, and 11) that are coupled together to enable fluid communication between the one or more sectional modules and for material passing through the fuel module system 104 from the container 102 to the portion of the engine 106 of the vehicle. It is to be appreciated that the fuel module system 104 may be fabricated as a single module or as one or more modules, which can be chosen with sound engineering judgment without departing from the intended scope of coverage of the embodiments of the subject invention.

The fuel module system 104 provides various features of management, monitoring, and/or adjustment for the material that is delivered from the container 102 to the engine 106. The fuel module system 104 can include one or more sensors that measure pressure, temperature, and/or flow rate (collectively referred to as "the material parameters") of the material at one or more locations while the material is delivered from the container 102, through the fuel module system 104, and delivered to the portion of the engine 106. It is to be appreciated that the fuel module system 104 can measure the material parameters within the container 102, prior to being drawn from the container 102, a location between the container 102 and receipt at the fuel module 104, prior to entering a first filter for a first pressure, after being passed through the first filter for the first pressure, prior to entering a regulator, after being passed through the regulator, prior to entering a second filter for a second pressure in which the first pressure is higher than the second pressure, after being passed through the second filter for the second pressure, prior to exiting the fuel module system 104, a location between the fuel module system 104 and receipt at a portion of the engine 106, a location prior to delivery to a combustion chamber, or a combination thereof.

The fuel module system 104 can adjust the material received at the first pressure from the container 102 to a second pressure, wherein the second pressure is within a target range for the pressure as optimized for the engine 106. Moreover, the fuel module system 104 can manage a temperature of the material such that the material received from the container 102 at a first temperature is adjusted to a second temperature that is within the target range for the temperature as optimized for the engine 106. Additionally, the fuel module system 104 can adjust a first flow rate for the material from the container 102 to a second flow rate that is within the target range for the flow rate as optimized for the engine 106. It is to be appreciated that the material parameters can be adjusted independently or collectively. Moreover the adjustment of the material parameters by the fuel module system 104 can be in situ so as to adjust to the target range parameters. In addition, it is to be appreciated that the fuel module system 104 can adjust at least one of the first temperature, the first pressure, and the first flow rate by increasing, decreasing, or maintaining such reading.

The fuel module system 104 can further filter the material from the container 102. In an embodiment, the fuel module system 104 can include one or more filters that filter the material received from the container 102, wherein the filtration of the material removes unwanted debris or substances (e.g., oil, condensation, particulate, other contaminants, etc.). For example, the fuel module system 104 can be configured to receive one or more coalescing filters or micron filters to filter the material that passes through the fuel module system 104. In a particular example, the fuel module system 104 can filter the received material at the first pressure from the container 102 and also filter the material at the second pressure prior to delivery to the engine 106 or a portion of the engine 106, wherein the second pressure is lower than the first pressure.

In an embodiment, the target pressure range of the material can be based on the type of material, the engine 106, or a combination thereof, wherein the fuel module system 104 can adjust the first pressure of the material to the target pressure range. In a particular example, the target pressure range can be between approximately 60 and 85 pounds per square inch (psi). In another example, the target pressure range can be between approximately 60 psi to 150 psi. In another example, the target pressure range can be between approximately 90 psi to 120 psi. In another example, the target pressure range can be between approximately 80 psi to 85 psi. It is to be appreciated that the target pressure range can be chosen with sound engineering judgment without departing from the intended scope of coverage of the embodiments of the subject invention.

In an embodiment, the target temperature of the material can be based on the type of material, the engine 106, or a combination thereof, wherein the fuel module system 104 can adjust the first temperature of the material to the target temperature range. In a particular example, the target temperature range can be between −40 degrees Fahrenheit (F) and 200 degrees F. It is to be appreciated that the target temperature range can be chosen with sound engineering judgment without departing from the intended scope of coverage of the embodiments of the subject invention.

In an embodiment, the target flow rate range of the material can be based on the type of material, the engine 106, or a combination thereof, wherein the fuel module system 104 can adjust the first flow rate of the material to the target flow rate range. In a particular example, the target flow rate range can be between approximately 90 pounds per hour ("lb/hr") to 170 lb/hr. It is to be appreciated that the target flow rate range can be chosen with sound engineering judgment without departing from the intended scope of coverage of the embodiments of the subject invention.

The fuel module system 104 can further adjust the material parameters based on at least one of a distance of tubing or plumbing between the container 102 and an inlet of the fuel module system 104, a distance of tubing or plumbing between an outlet of the fuel module system 104 and the portion of the engine 106 or the combustion chamber that receives the processed material, a diameter of the tubing or plumbing between the container 102 and the fuel module system 104, a diameter of the tubing or plumbing between the fuel module system 104 and the portion of the engine 106 or the combustion chamber that receives the processed material, or a combination thereof.

Figure 2:
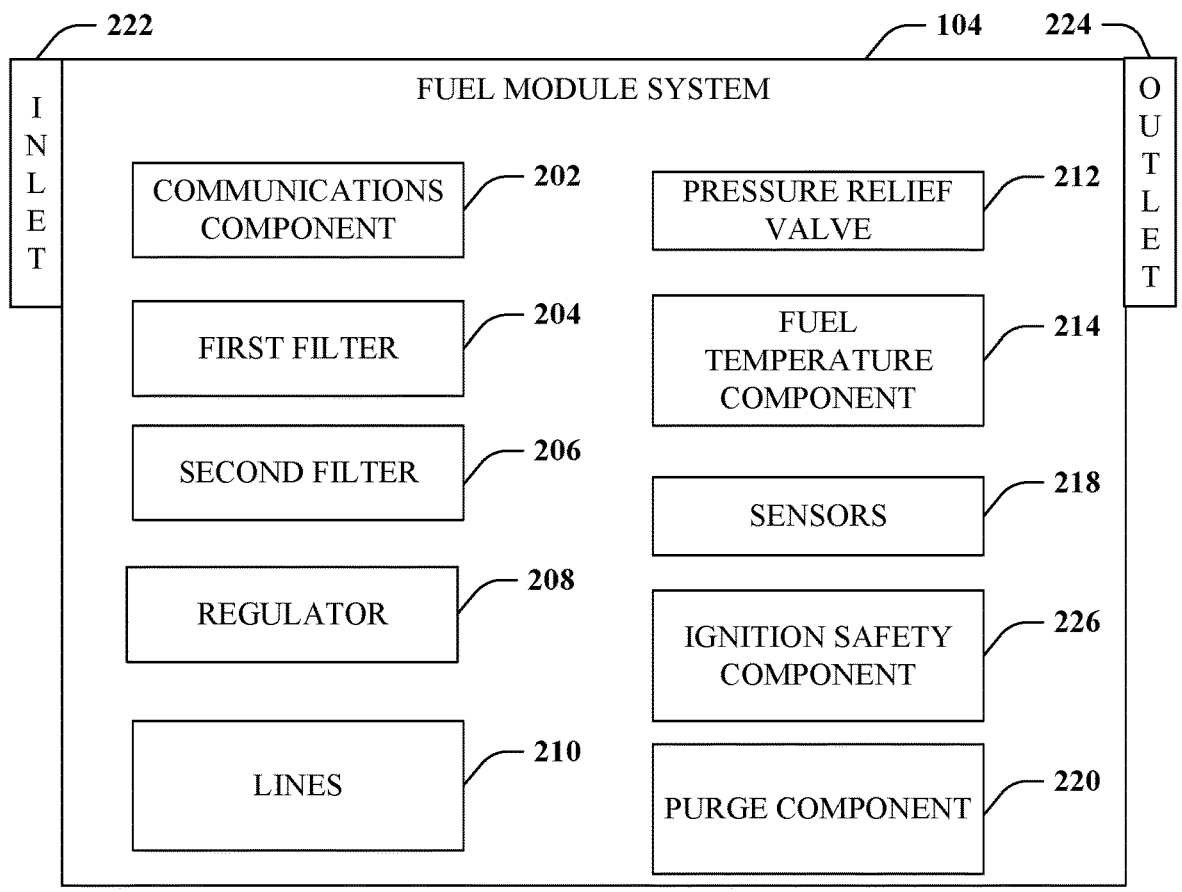
FIG. 2 is block diagram of a fuel module system.

Turning to FIG. 2, the fuel module system 104 is illustrated. The fuel module system 104 can include a communications component 202. The communications component 202 can be configured to receive data and transmit data. In an embodiment, the communications component 202 provides communications internal to a vehicle such as between the CPU 108 and the fuel module system 104. For instance, data collected by the CPU 108 can be communicated and utilized by the fuel module system 104 to adjust a parameter (e.g., temperature, pressure, flow rate, among others) related to the material from the container 102. In another embodiment, the communications component 202 can provide communications with a component outside the vehicle (e.g., external to the vehicle). By way of example and not limitation, the communications component 202 can receive data or transmit data to a network or server or a computer that allows real-time adjustment of a parameter related to the material. It is to be appreciated that the communications component 202 can provide wireless communications that allow data collected to be aggregated and/or viewed as well as receive instructions for a change to a parameter (e.g., temperature, pressure, flow rate, among others) that the fuel module system 104 can adjust or change.

The communications component 202 can be incorporated into the CPU 108 of the vehicle, a stand-alone component, or a combination thereof. The communications component 202 can receive, collect, or request data from at least one of the CPU 108 of the vehicle, an ECM, an ECU, a standard SAE J1939 vehicle bus, one or more sensors directly or indirectly, or a combination thereof. The communications component 202 can employ wired or wireless communications. Moreover, the communications component 202 can be configured to receive data related to at least one of the first temperature of the material, the first pressure of the material, the first flow rate of the material, one or more material parameters prior to entering the fuel module system 104, one or more material parameters prior to exiting the fuel module system 104, one or more material parameters prior to being delivered to a portion of the engine 106, one or more material parameters prior to exiting the fuel module 104, one or more material parameters within the container 102, or a combination thereof.

Figure 7:
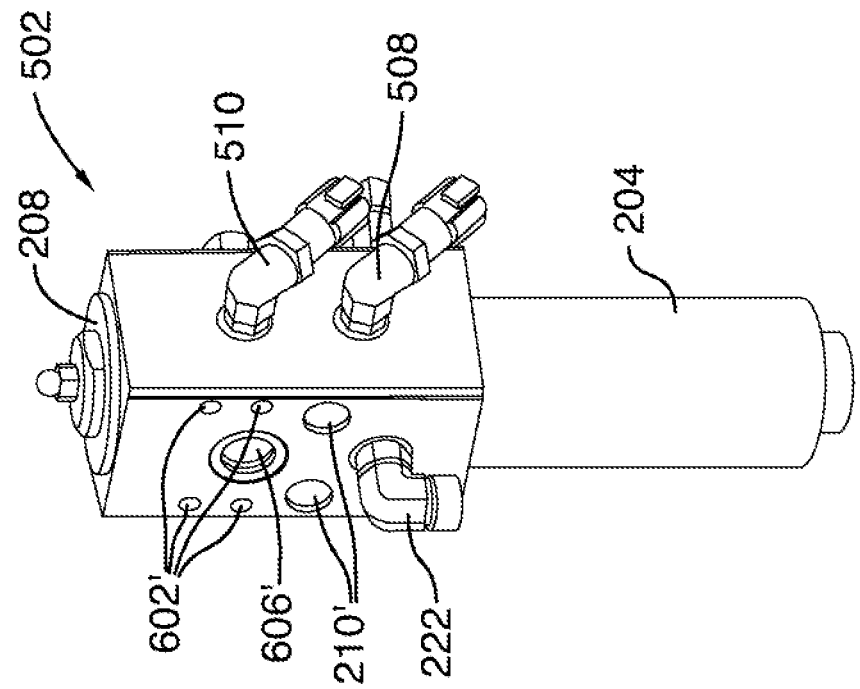
FIG. 7 is an illustration of a portion of a fuel module system.

The fuel module system 104 can include a first filter 204, a second filter 206, a regulator 208, and one or more lines 210. The first filter 204 can filter the material from the container 102 having a first pressure, wherein the first pressure is higher than a second pressure. The filtered material is then delivered to the regulator 208 that can reduce a pressure of the material from the first pressure to the second pressure, wherein the second pressure is within a target range for pressure that is optimized for the engine 106. In an embodiment, the regulator 208 can be a manual regulator (as shown in FIGS. 5, 7, and 12) for example employing a solenoid or not employing a solenoid to control pressure and flow rate. In another embodiment, the regulator 208 can be an electric regulator 208' (as shown in FIGS. 11 and 13) that controls pressure and flow rate having an electrical connection for power via electrical wires 1102. In another embodiment, the fuel module system 104 can include one or more regulators 208. In particular, an additional regulator can be used, wherein the regulator 208 is positioned proximate to the container 102 and the additional regulator is positioned proximate to the engine 106.

By way of example and not limitation, the first pressure can be 3600 psi and the second pressure can be 85 psi, wherein the target range for the pressure that is optimized for the engine 106 can be between 55 psi and 90 psi. For example, the first pressure being approximate to 3600 psi can be a "high pressure" and the second pressure being approximate to 85 psi can be a "low pressure," wherein the first filter 204 is a high pressure filter and the second filter 206 is a low pressure filter each with respective sensors 218 to detect in situ readings and measurements. After the regulator 208 processes the material to the second pressure, the material is then filtered by the second filter 206.

In addition, the regulator 208 can adjust a flow rate of the material from the container 102 after the material has been filtered by the first filter 204. For example, the regulator 208 can adjust the first flow rate of the material to a second flow rate based on the second flow rate being within a target range for flow rate that is optimized for the engine 106 (e.g., based on manufacturing details, type of engine, size of engine, a parameter related to the engine, among others). By way of example and not limitation, the target range for flow rate can be approximately 70 pounds per hour ("lb/hr") to 200 lb/hr.

The one or more lines 210 can be utilized to maintain or adjust a temperature for the module or sectional modules that the material is being processed through in the fuel module system 104 and, in turn, adjust or maintain a temperature of the material within the fuel module system 104. For example, the module or sectional modules can include a rubber diaphragm that can become brittle if temperature is maintained. In an embodiment, the lines 210 can cycle engine coolant to the module or sectional modules (e.g., the body indicated at 502 and 504, independently or collectively) of the fuel module system 104 to maintain or adjust a temperature and, in turn, adjust or maintain the temperature of the material. In another embodiment, an electric heater or waterline can be employed to adjust the temperature of the material through the temperature change of the module or sectional modules through which the material travels. The lines 210 can deliver at least one of engine coolant, water, Freon, AC compression fluid, or material from an electric heater line or waterline, or a combination thereof.

In an embodiment, the regulator 208 can manage a pressure and a flow of delivery to the engine 106 based on at least one of a pressure of the container 102, data collected by the CPU 108, a parameter (e.g., size, pressure, model, temperature, type of material, etc.) related to the container 102, a parameter (e.g., revolutions per minute (RPM), speed, gear that the transmission is in, temperature, etc.) related to the engine 106, a vehicle type or class, and/or a combination thereof. In an embodiment, the regulator 208 can be an electronic regulator that is part of a fuel map for the vehicle.

The proximity of the fuel module system 104 and the included regulator 208 can be a factor in managing the delivery of the material to the engine. For example, a "pressure wave" is used herein and defined as a factor that changes or affects a parameter related to the material that is delivered to a portion of an engine, wherein the change is dependent upon a distance of plumbing the material travels between the regulator 208 and a portion of the engine 106. Additionally, the pressure wave can include changes or affects a parameter related to the material that is delivered to the portion of the engine 106, wherein the change is dependent upon a diameter of the plumbing the material travels in between the regulator 208 and the portion of the engine. In other words, a pressure wave can result from the distance or proximity of the fuel module system 104 to the engine 106 as well as a plumbing or tubing or line size. The fuel module system 104 can take into account a distance or a diameter of plumbing in order to compensate for an optimal temperature, pressure, or flow rate of the material for the engine.

The fuel module system 104 can include one or more pressure relief valves 212. The pressure relief valve 212 (also referred to as a pressure relief device (PRD)) is a device adapted to sense one or more physical parameters, such as, without limitation, pressure, temperature, or stress, within or around the fuel module system 104 and to vent the contents of the fuel module system 104 to the environment if the one or more physical parameters meet a predetermined standard or defined range. In one embodiment a PRD may be adapted to sense pressure within the fuel module system 104 and to vent the contents thereof to the environment if the pressure is more than some predetermined pressure. In some non-limiting embodiments, the predetermined pressure may be 50% of the maximum pressure the fuel module system 104 may contain without bursting or otherwise failing.

The fuel module system 104 can include a fuel temperature component 214 that is configured to manage a temperature of material to be delivered to the engine 106. The material from the container 102 can be received at a first temperature and adjusted to a target temperature by the fuel temperature component 214. As discussed above, the lines 210 can be utilized to adjust the first temperature to a second temperature, wherein the second temperature is within a target range for a temperature that is optimized for the engine 106.

The fuel module system 104 can include one or more sensors 218. The sensors 218 can be, but are not limited to being, a pressure sensor, a fuel temperature sensor, a low pressure filter sensor, a high pressure filter sensor, a first filter sensor, a second filter sensor, a pressure in sensor (in to the fuel module system 104), a pressure out sensor (out to the engine 106), a filter health sensor for a high pressure filter or a low pressure filter, a temperature sensor for incoming material to the fuel module system 104, a temperature sensor for outgoing material to the engine 106, a sensor that detects a parameter related to the engine 106, among others.

The fuel module system 104 can include one or more sensors 218 that measure pressure, temperature, and/or flow rate (collectively referred to as "the material parameters") of the material at one or more locations while the material is delivered from the container 102, through the fuel module system 104, and delivered to the portion of the engine 106. It is to be appreciated that the sensors 218 can measure the material parameters within the container 102, prior to being drawn from the container 102, a location between the container 102 and receipt at the fuel module 104, prior to entering a first filter 204 for a first pressure, after being passed through the first filter 204 for the first pressure, prior to entering a regulator 208, after being passed through the regulator 208, prior to entering a second filter 206 for a second pressure in which the first pressure is higher than the second pressure, after being passed through the second filter 206 for the second pressure, prior to exiting the fuel module system 104, a location between the fuel module system 104 and receipt at the portion of the engine 106, a location prior to delivery to a combustion chamber, or a combination thereof.

The one or more sensors 218 can further monitor a boost for the engine 106, a crank position of the engine 106, a revolution per minute (RPM) of the engine 106, a speed of the vehicle, a terrain the vehicle is traveling on, an oxygen level or amount in the material, a fuel mapping for the vehicle, a boost or turbo boost related to the engine 106, a load the vehicle is towing or carrying, among others.

It is to be appreciated that the sensors 218 can continuously monitor in real time and such real time monitoring can be utilized to adjust the material parameters to be within the target range parameters that are optimized for the engine 106. In particular, a container sensor can be utilized to monitor a pressure in the container 102 as such pressure can affect the target range for pressure to deliver the material for the engine 106. Moreover, as the pressure in the container 102 changes, the pressure for the material being processed by the fuel module system 104 is adjusted as well. For example, as the pressure of the container 102 decreases as material is processed and consumed, the target range for pressure is also adjusted continuously since the change in the container pressure directly impacts the processed material.

It is to be appreciated that the sensors 218 can communicate data to at least one of the fuel module system 104, the CPU 108, an engine control module (ECM), an engine control unit (ECU), and the like. It is to be appreciated that a sensor can monitor and detect readings for one or more parameters. By way of example and not limitation, a sensor can be positioned within the fuel module system 104 at a location and detect one or more of pressure, temperature, or flow rate. In another example, a respective sensor can be positioned within the fuel module system 104 to monitor and detect readings for each of temperature, pressure, and flow rate.

The fuel module system 104 can include an ignition safety component 226 that includes a key on/off circuit in which a solenoid valve on the container 102 is closed when a key is off and open when a key is on. The ignition safety component 226 can be further utilized with a sensor that detects if the engine 106 is running such that if the engine 106 is running, the solenoid valve is open on the container 102 and if the engine 106 is not running, the solenoid valve is closed on the container 102. In an embodiment, the solenoid valve can be included in the fuel module system 104. The amount of fuel contained in a supply line between fuel module system 104 and the solenoid valve on the container 102 and the supply line between the fuel module system 104 and the engine 106 is minimal and not a safety concern.

Figure 3:
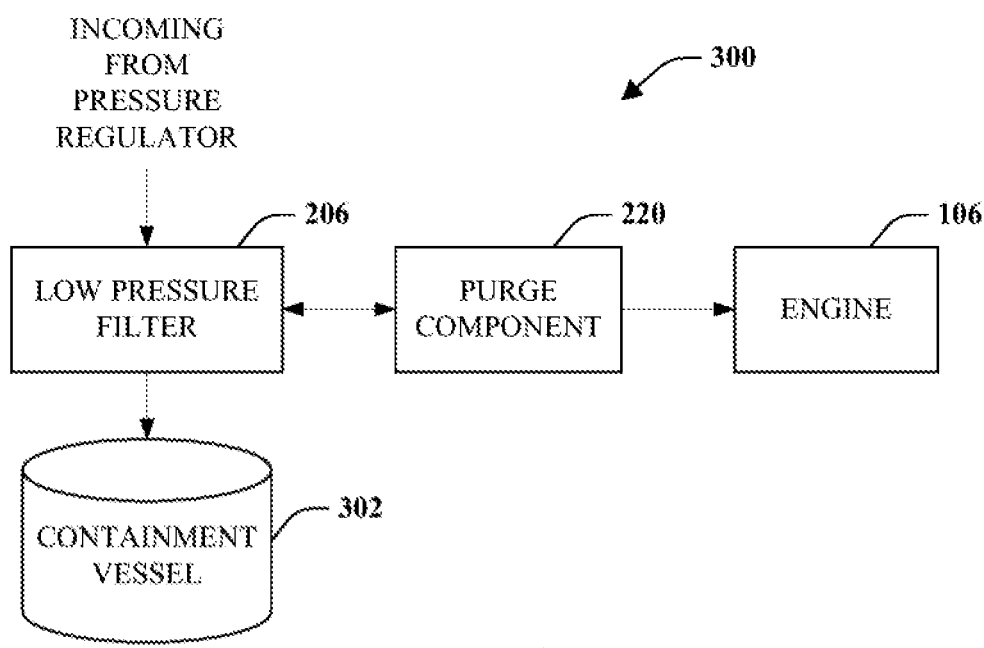
FIG. 3 is block diagram of a purge system.

The fuel module system 104 can further include a purge component 220. It is to be appreciated that the purge component 220 can manually or automatically purge or cleanse the low pressure filter using the material from the container 102. The purge component 220 can allow a purge or clean of a low pressure filter using the material from the container 102. The purge component 220 can be controlled manually or automatically based on a parameter such as, but not limited to, duration of time, a sensor that detects build-up on the low pressure filter, a manual switch or notification, a mileage traveled, an amount of material consumed by the engine 106, among others. The purge component 220 can activate a solenoid valve to stop a flow of material to the engine 106, which cycles the material through the low pressure filter for a purge or cleaning and such material used to purge or clean is collected in a containment vessel 302 (as illustrated in system 300 in FIG. 3). Such use of a containment vessel 302 provides for an environmentally safe manner rather than expelling such purge to the open air. In addition, the containment vessel 302 can be accessed to recycle the purged material stored therein.

The fuel module system 104 can further include an inlet 222 and an outlet 224. The inlet 222 can be configured to allow fluid communication between the fuel module system 104 and one or more containers 102, wherein the fluid communication is employed by plumbing, tubing, connectors, and valves, among others. The material housed in the container 102 can be received by the fuel module system 104 via the inlet 222 through which the material is passed through the fuel module system 104 and processed. The outlet 224 can be configured to allow fluid communication between the fuel module system 104 and a portion of the engine 106 or the engine 106, wherein the fluid communication is employed by plumbing, tubing, connectors, valves, among others. The material that is passed through the fuel module system 104 and processed can exit the fuel module system 104 and be delivered to the engine 106 for consumption and use.

Figure 4:
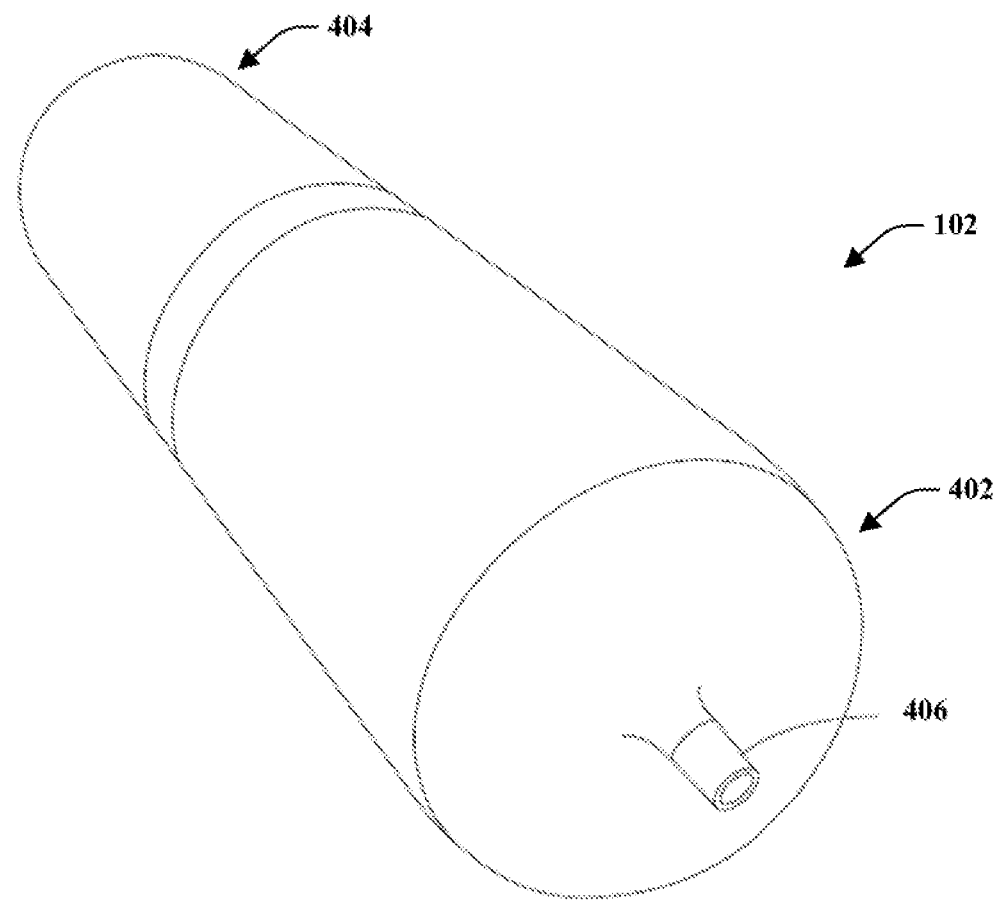
FIG. 4 is an illustration of a container.

Turning to FIG. 4, the container 102 is illustrated. The container can be utilized with the one or more fuel storage systems 28. The container 102 can include a first end 402, a second end opposite thereto 404, a neck 406 located on the first end 402 and a pressure release device (PRD) on the second end 404. It is to be appreciated that the first end 402 and the second end 404 can include a neck and/or a PRD and/or a valve to fill or draw material in/from. The neck 406 can be configured to receive a valve or fitting that enables filling or dispensing of a portion of material. For instance, the valve can be a two-way valve that allows material to enter the container 102 and also allow the material to exit the container 102. The container 102 can be cylindrical in shape with a length, a diameter, and a thickness. Yet, it is to be appreciated that the container 102 shape, materials, composition, or size can be chosen with sound engineering judgment without departing from the intended scope of coverage of the embodiments of the subject invention. The container 102 can include one or more liners of a material. For instance, the container 102 can include a liner made of a first material. In certain embodiments, the first material is at least one of a plastic, a metal, a steel, a thermoplastic, among others. In certain embodiments, the container 102 can include a wrapping of a second material. In certain embodiments, the second material is at least one of a carbon fiber, a composite material, Teflon, or a disparate material from the first material. In certain embodiments, the container 102 is made of at least one of a metal, a plastic, a polymer, or a composite material.

In an embodiment, the container 102 can include a closed end on the second end 404 and an open end opposite thereto (e.g., on the first end 402), wherein the open end is integrated with at least one of a boss, a neck, a valve, an opening configured to couple to a valve, among others. It is to be appreciated that the open end on the container 102 can be configured to receive material that is stored in the container 102 and/or configured to dispense material that is stored in the container 102, wherein the dispensing/receiving is with a component such as a valve, port, and the like. In another embodiment, the container 102 can include a valve on the first end 402 and a PRD on the second end 404, wherein the PRD can be configured to release pressure from the container 102 based on a parameter such as a pressure level, a safety event, a computer instruction to release the material in the container 102, among others. It is to be appreciated that the container 102 can include an open end on the first end 402 and an open end on the second end 404, wherein each open end can be integrated with at least one of a boss, a neck, a valve, an opening configured to couple to a valve, among others. In an embodiment, the container 102 can utilize the open end on the first end 402 to receive material for the container 102 and the open end on the second end 404 to deliver material from the container 102, wherein each open end can utilize a valve such as, but not limited to, a one-way valve, a two-way valve, among others.

It is to be appreciated that the container 102 can include one or more valves. For instance, the container 102 can include a first valve on the first end 402 and the PRD on the second end 404. In another instance, the container 102 can include a first valve on the first end 402 and an additional valve on the second end 404 opposite thereto. Moreover, it is to be appreciated that the container 102 can include one or more chambers within to house one or more materials. For example, a cylinder can be segmented to have a first chamber that houses a first material filled/dispensed with a first valve on the first end 402 and a second chamber that houses a second material filled/dispensed with a second valve on a second end 404 opposite to the first end.

It is to be appreciated that the container 102 can house a portion of a material, wherein the material can be a solid, a gas, a liquid, a plasma, among others. By way of example and not limitation, the material can be an alternative fuel. In still another example that is not limiting on the subject innovation, the material can be a material at a high pressure in comparison to atmospheric pressure.

In still another example, one or more containers 102 can be used with a fuel system for a vehicle. For example, in addition to compressed natural gas, the container 102 can be utilized with a fuel system that utilizes or consumes renewable fuel sources, nonrenewable fuel sources, liquid fuel sources, or gas fuel sources for a vehicle, wherein the container 102 can store such renewable fuel sources, nonrenewable fuel sources, liquid fuel sources, or gas fuel sources. Renewable fuel sources can include biofuels such as vegetable oil, ethanol, methanol, butanol, other bioalcohols, biomass, or biodiesel, among others. Renewable fuel sources can also include hydrogen and/or hydrogen fuel cells, refuse-derived fuel, chemically stored fuel, non-fossil methane, non-fossil natural gas, ammonia, formic acid, liquid nitrogen, compressed air, dimethyl ether (DME), or propane derived from renewable methods, among others. Nonrenewable fuel sources can include gasoline, propane, or diesel, among others. Additional liquid or gas fuel sources can include any mixture or blend of energy sources, for example, E10, E15, E30, or E85 fuel, or HCNG (blend of compressed natural gas with hydrogen). It is to be appreciated that the container 102 can house a material chosen with sound engineering judgment without departing from the intended scope of coverage of the embodiments of the subject invention and such material can be used for a fuel system of a vehicle, a machine, a device, or any combination thereof.

Turning to FIGS. 5-7, and 11-13, the fuel module system 104 is illustrated. In an embodiment, the fuel module system 104 can be fabricated from one or more sectional modules or members. In particular, the fuel module system 104 can include a first sectional module 502 and a second sectional module 504, wherein the first sectional module 502 and the second sectional module 504 can be removeably coupled and disconnected as illustrated in FIGS. 6 and 7. FIG. 6 illustrates the second sectional module 504 separated from the first sectional module 502 (shown in FIG. 7). The second sectional module 504 can include one or more threaded bolts 602 that are configured to couple or removeably couple to the one or more threaded holes 602'. Such coupling allows for a gas path 606 to mate with gas path 606', and lines 210 to mate with lines 210' without leakage. In an embodiment, the mating utilizes one or more "O" rings to secure the fluid communication between the first sectional module 502 and the second sectional module 504. The coupling of the first sectional module 502 to the second sectional module 504 can be selected with sound engineering judgment without departing from the intended scope of coverage of the embodiments of the subject invention. The first sectional module 502 can include at least one of the first filter 204, the inlet 222, the regulator 208, a first portion of the gas path 606, a first portion of one or more lines 210, and one or more sensors such as, but not limited to, first pressure sensor 508 and second pressure sensor 510. The second sectional module 504 can include at least one of the second filter 204, the outlet 224, a second portion of the gas path 606', a second portion of one or more lines 210', and one or more sensors such as, but not limited to, third pressure sensor 512, wherein the first portion 606 and the second portion 606' of the gas paths are in fluid communication with one another and the first portion 210 and the second portion 210' of the one or more lines 210 are in fluid communication with one another.

Turning back to FIG. 5, the first sectional module 502 includes a portion of plumbing or tubing 506 that delivers material from the container 102 to the inlet 222. The first sectional module 502 can be configured to receive a first filter 204 for the first pressure, wherein the first filter 204 filters the material upon receipt through the inlet 222. Prior to being filtered by the first filter 204, the pressure of the material is detected by the first pressure sensor 508. The material is then delivered from the first filter 204 to the regulator 208. The regulator 208 can be configured to adjust a flow rate and a pressure of the material after the material is filtered by the first filter 204. After the material is adjusted by the regulator 208, a pressure is detected for the material by a second pressure sensor 510. It is to be appreciated that the pressure of the material before the regulator 208 will be higher than the pressure of the material after the regulator 208 as discussed above. The material is delivered from the regulator 208 through a gas path 606 (shown in FIGS. 6-9) to a second filter 206. The second filter 206 provides filtration of the material at the lower pressure (compared to the pressure before the material was processed by the regulator 208). After the filtration of the material by the second filter 206, a pressure of the material is detected by a third pressure sensor 512. The material continues through the second filter 206 and is delivered to a portion of the engine 106 through the outlet 224.

The fuel module system 104 further includes an access plug 514 that allows fabrication of the gas path 606.

It is to be appreciated that the flow of material and process of the material as described above can include additional sensors 218 and, in particular sensors 218 related to a temperature or a flow rate. For example, sensors 218 can be positioned in locations prior to first filter 204, after regulator 208, and after second filter 206 to detect at least one of the temperature or the flow rate of the material. Accordingly, the fuel module system 104 can adjust the material parameters by utilizing the regulator 208, the lines 210, among others to achieve target ranges for each parameter.

Figure 9:
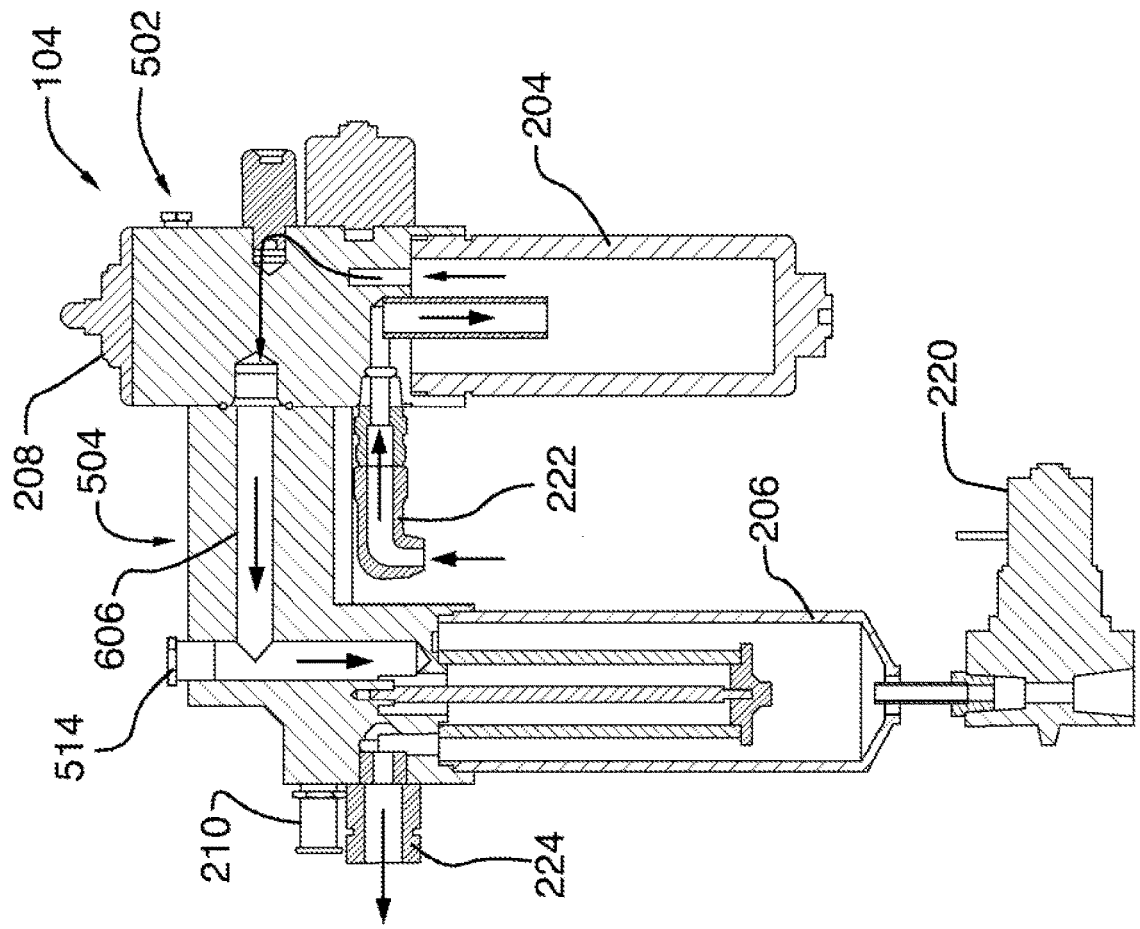
FIG. 9 is cross-sectional view of a fuel module system.
Figure 8:
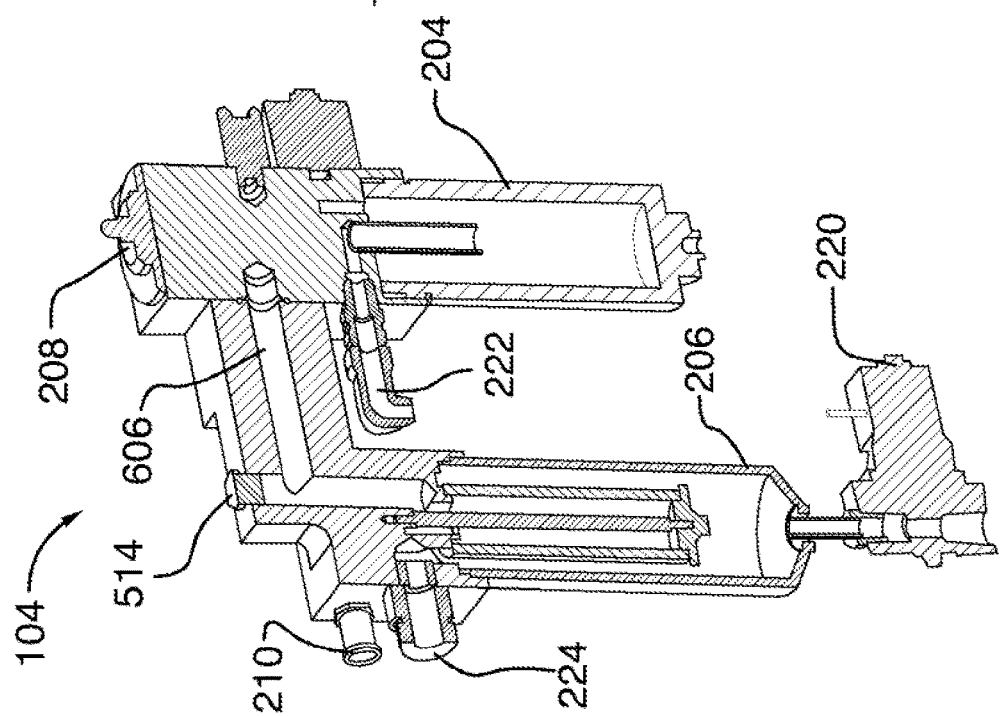
FIG. 8 is cross-sectional view of a fuel module system.
Figure 10:
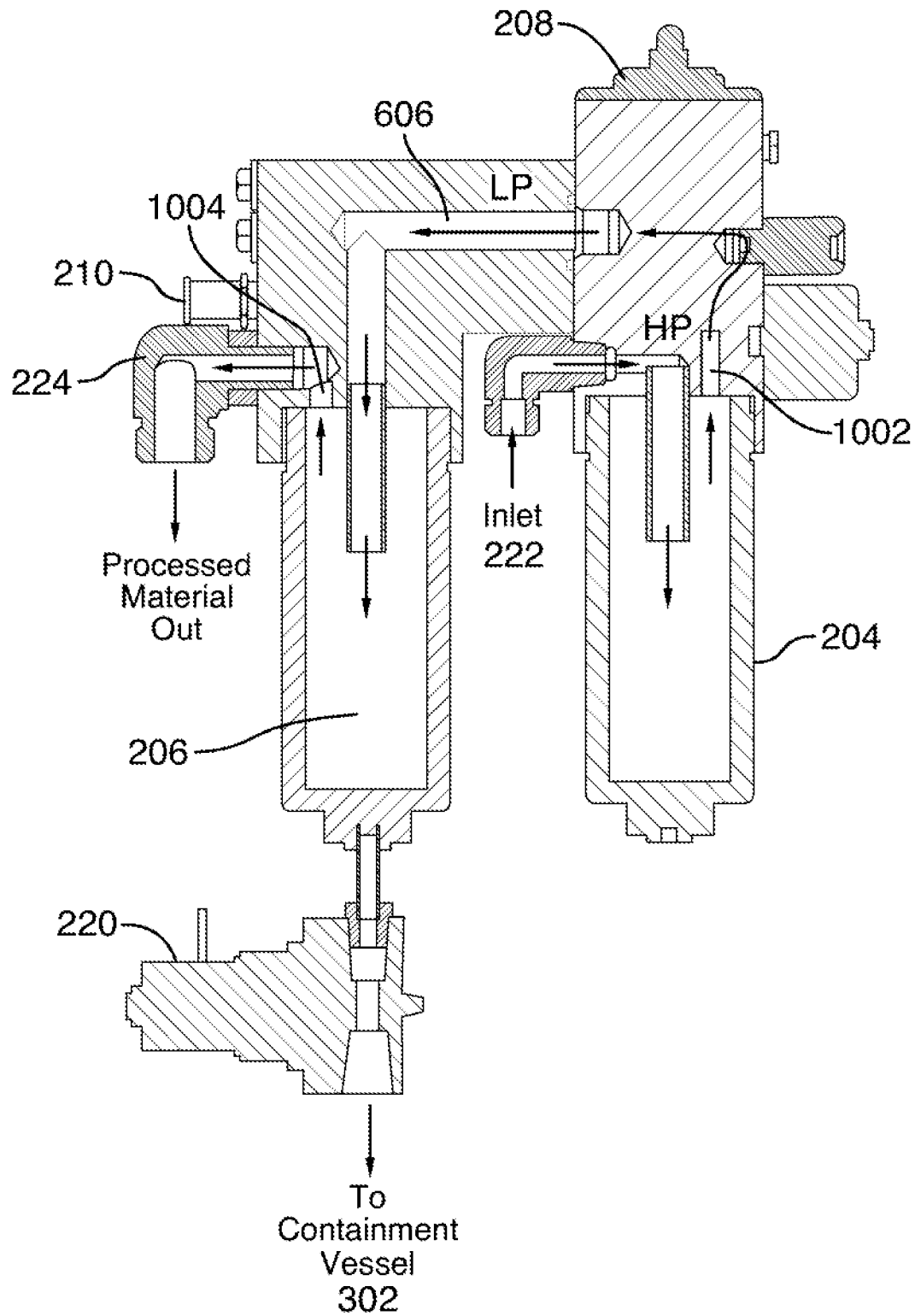
FIG. 10 is cross-sectional view of a fuel module system.

FIGS. 8-10 illustrate cross-sectional views of the fuel management system 104. Material from the container 102 can be received at the inlet 222 to enter at a first pressure (e.g., a high pressure) and be filtered by the first filter 204 (e.g., a high pressure filter). After being filtered, the material continues to the regulator 208, wherein the regulator 208 adjusts the material to a second pressure (e.g., a low pressure), wherein the second pressure is lower than the first pressure. Moreover, the regulator 208 adjusts the flow rate of the material so that the flow rate and the pressure of the material are within a target range that is optimal for the engine 106. The material, now at the second pressure continues through the gas path 606 to the second filter 206 (e.g., the low pressure filter). After being filtered, the material continues to the outlet 224 for delivery to the engine 106 or a portion of the engine 106 (illustrated as "processed material out").

As illustrated, the purge component 220 is in fluid communication with the second filter 206, wherein a purge action can be initiated in which the material flows to cleanse the second filter 206 and rather than the material flow to the outlet 224, the material travels through the purge component 220 and into the containment vessel 302. For example, a valve can be controlled to direct flow to the containment vessel 302 rather than the outlet 224.

One or more sensors 218 can be incorporated into the fuel module system 104. For example, one or more temperature sensors can be positioned in a location to provide readings to allow the fuel module system 104 to adjust the temperature into a target range that is optimal for the engine 106. For example, the locations can be, but are not limited to being, in a container 102, prior to filtration by the first filter 204, after filtration by the first filter 204, prior to being processed by the regulator 208, after being processed by the regulator 208, prior to being filtered by the second filter 206, after being filtered by the second filter 206, in a portion of plumbing between the container 102 and the inlet 222, in a portion of plumbing between the engine 106 and the outlet 224, or a combination thereof. It is to be appreciated that the one or more temperature sensors can be utilized alone or in combination with at least one of the flow rate sensors, the pressure sensors, or any other sensor described herein.

In another example, one or more pressure sensors can be positioned in a location to provide readings to allow the fuel module system 104 to adjust the pressure into a target range that is optimal for the engine 106. For example, the locations can be, but are not limited to being, in a container 102, prior to filtration by the first filter 204, after filtration by the first filter 204, prior to being processed by the regulator 208, after being processed by the regulator 208, prior to being filtered by the second filter 206, after being filtered by the second filter 206, in a portion of plumbing between the container 102 and the inlet 222, in a portion of plumbing between the engine 106 and the outlet 224, or a combination thereof. It is to be appreciated that the one or more pressure sensors can be utilized alone or in combination with at least one of the flow rate sensors, the temperature sensors, or any other sensor described herein.

In another example, one or more flow rate sensors can be positioned in a location to provide readings to allow the fuel module system 104 to adjust the flow rate into a target range that is optimal for the engine 106. For example, the locations can be, but are not limited to being, in a container 102, prior to filtration by the first filter 204, after filtration by the first filter 204, prior to being processed by the regulator 208, after being processed by the regulator 208, prior to being filtered by the second filter 206, after being filtered by the second filter 206, in a portion of plumbing between the container 102 and the inlet 222, in a portion of plumbing between the engine 106 and the outlet 224, or a combination thereof. It is to be appreciated that the one or more flow rate sensors can be utilized alone or in combination with at least one of the pressure sensors, the temperature sensors, or any other sensor described herein.

In an embodiment, the first filter 204 can include an outlet 1002 (shown in FIG. 10) from the first filter 204 (after filtration at the first pressure) to the regulator 208 that has an approximately ¼ inch diameter. In an embodiment, the second filter 206 can include an outlet 1004 (shown in FIG. 10) from the second filter 206 (after filtration at the second pressure) to the outlet 224 that has an approximately ⅜ inch diameter. As discussed above, the first filter 204 and the second filter 206 can be, but are not limited to being, coalescing filters. By way of example and not limitation, the first filter 204 can be a grade 6 filter that provides at least one of 788 CFM @ 3600 psi (1960 lb per hour) or 25 CFM @ 100 psi (62 lb per hour). By way of example and not limitation, the second filter 206 can be a grade 10 filter that provides at least one of 50 CFM @100 psi (124 lb per hour) having a sump capacity of 5 oz.

FIGS. 14-20 illustrate non-limiting embodiments of fuel storage systems 28 that includes one or more containers 102 configured in a vertical orientation. The fuel module system 104 can be mounted on a portion of a vehicle at a location that is between a fuel storage 28 and an engine of the vehicle. In another embodiment, the fuel module system 104 can be positioned inside or proximate to the fuel storage system 28. By way of example and not limitation, the fuel module system 104 can be coupled to a frame of a vehicle or a chassis of a vehicle. In an embodiment, the fuel module system 104 can be coupled to the frame of the vehicle, wherein the fuel module system 104 is at a location that is at least one of above the frame, below the frame, parallel with the frame or substantially parallel with the frame. In another embodiment, the fuel module system 104 can be coupled to a member and the member can be coupled to the frame. It is to be appreciated that the fuel module system 104 can be coupled to one or more members of which one or more of said members are coupled to the frame of the vehicle. In another embodiment, the fuel module system 104 is coupled to the fuel storage system 28 or enclosed within the fuel storage system 28.

Figure 14:
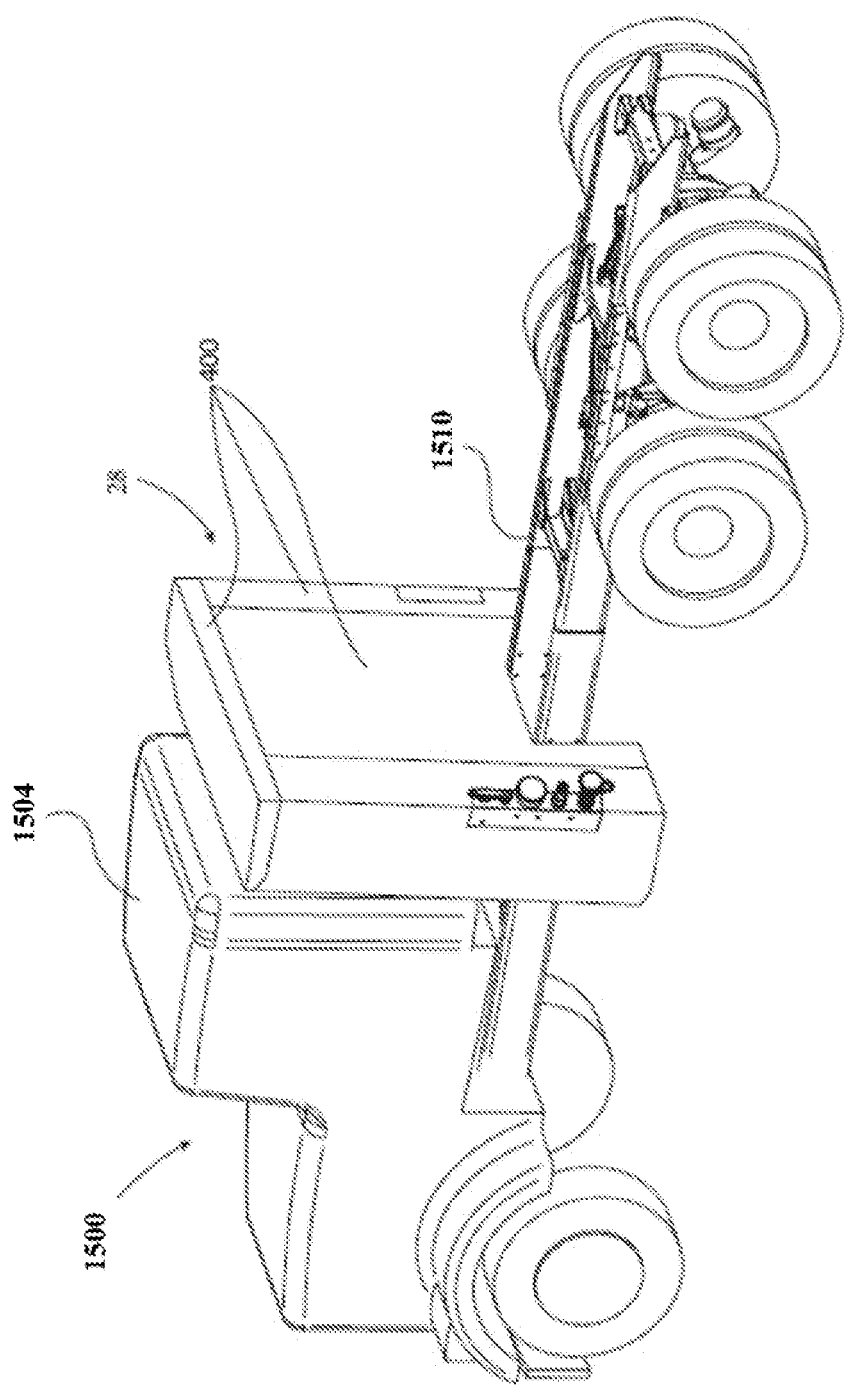
FIG. 14 is an illustration of an embodiment of a fuel storage system coupled to a vehicle that can utilize a fuel module system.
Figure 15:
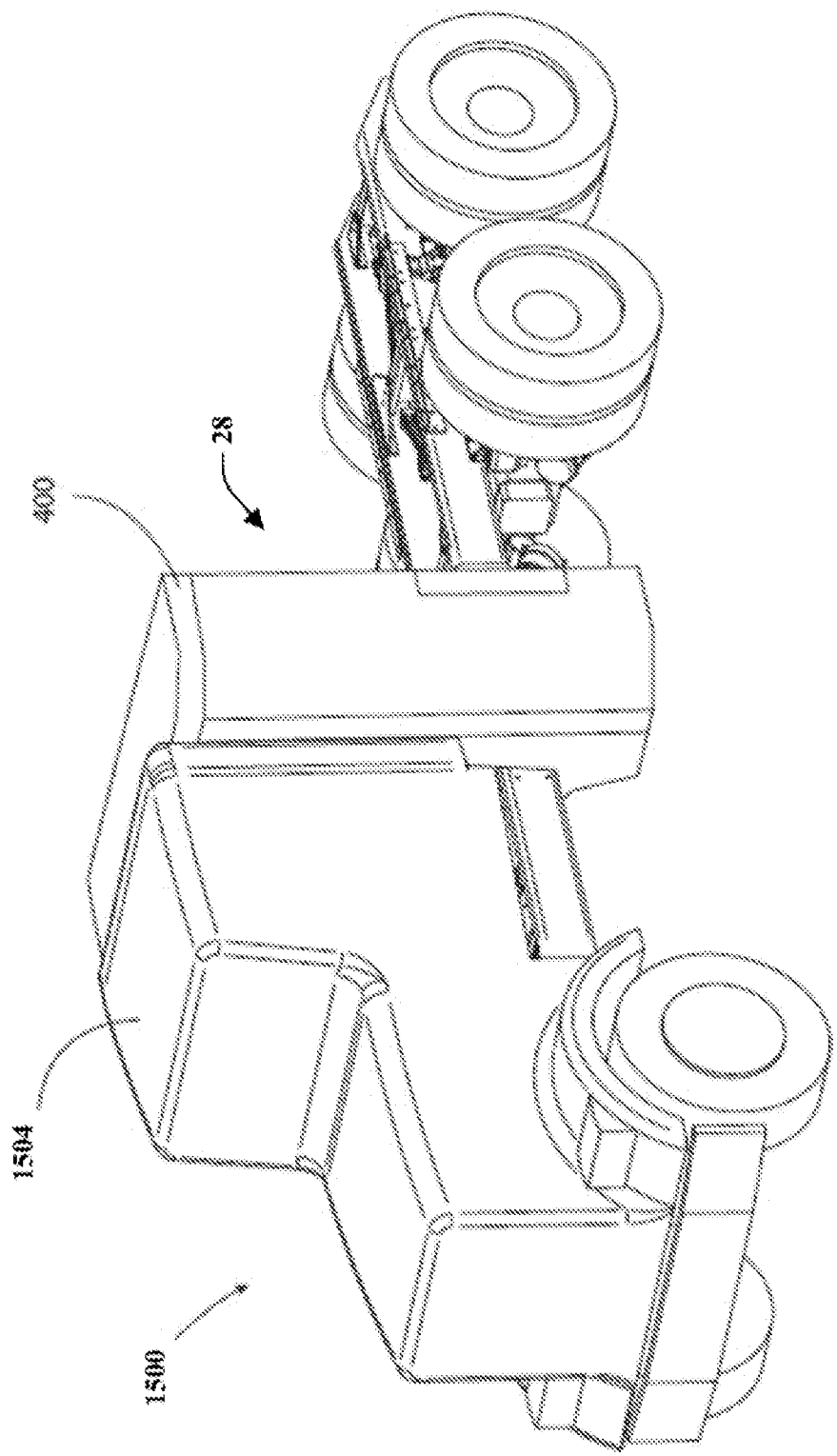
FIG. 15 is an illustration of an embodiment of a fuel storage system coupled to a vehicle that can utilize a fuel module system.

FIGS. 14-15 illustrates the fuel storage system 28 is a non-limiting embodiment that includes one or more containers 102 that are configured to house a material, each container 102 may be cylindrical in shape with a length, a diameter, and a first end 402 opposite a second end 404 in which the first end 402 includes a valve opening; a frame that couples to at least the one or more containers 102; a casing 400 that surrounds the frame and the one or more containers 102; the length of the one or more containers 102 are oriented in a vertical position; the frame is adapted to attach to a portion of a chassis 1510 of a vehicle 1500, wherein the frame, the casing 400, and the one or more containers 102 are located behind a cabin 1504 of the vehicle 1500; and the one or more containers 102 are connected to the frame with a first neck mount for the first end of each of the one or more containers 102 and a second neck mount for the second end of each of the one or more containers 102.

It should be understood that in other acceptable embodiments the orientation of the one or more containers 102 need not be vertical; the containers 102 may be horizontal in the system 28 illustrated in FIGS. 14-15 or in some other orientation such as, without limitation, slanted. For example, the one or more containers 102 can be angled at any degree from 0 degrees being parallel to the ground to 90 degrees being perpendicular to the ground.

Figure 16:
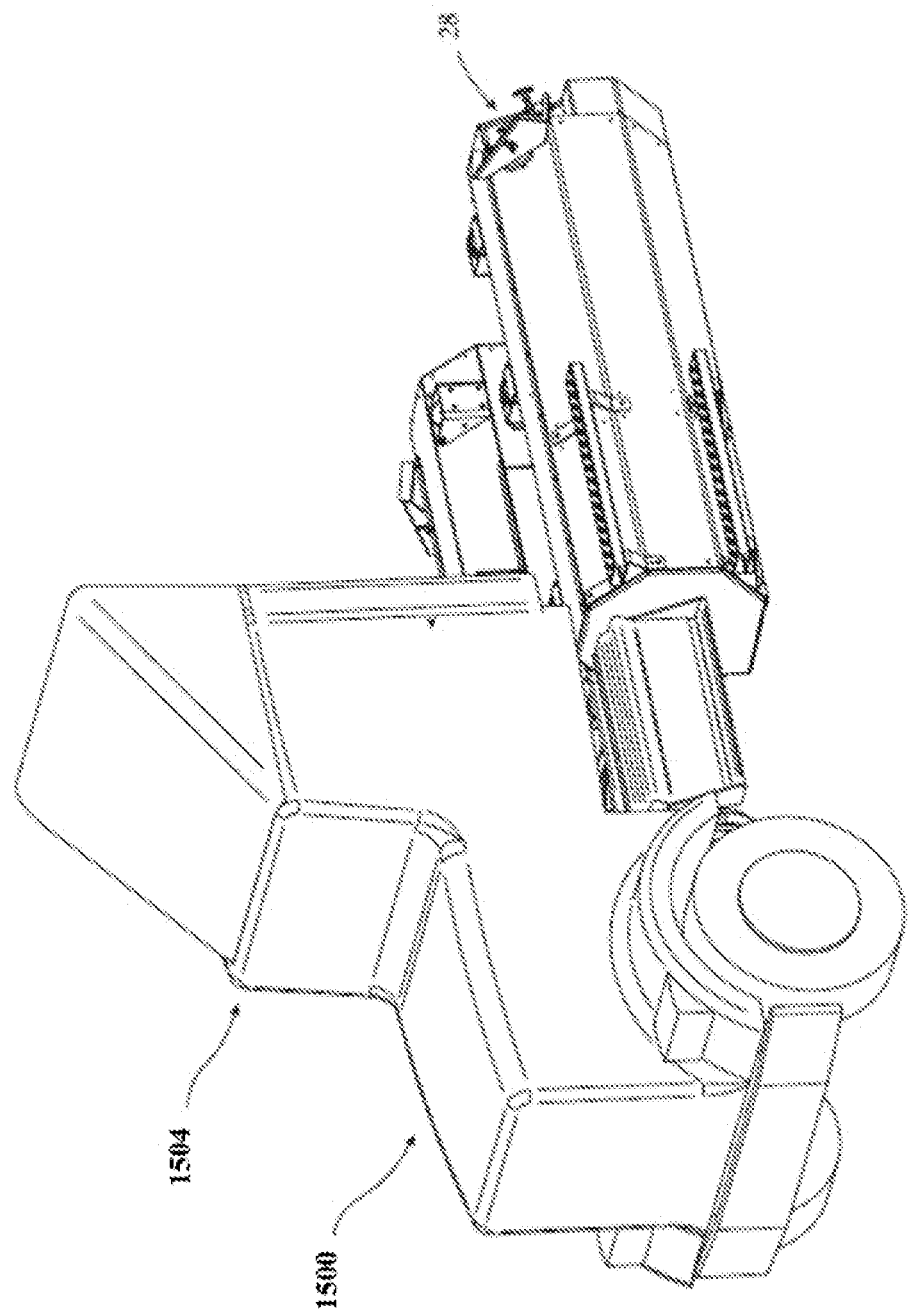
FIG. 16 is an illustration of an embodiment of a fuel storage system coupled to a vehicle that can utilize a fuel module system.

As shown in FIG. 16, the fuel storage system 28 can house the one or more containers 102 in a position that is underneath a portion of cabin 1504 and along a side, such as without limitation, the driver-side or the passenger side, of the vehicle 1500. It should be understood that in the fuel storage system 28 shown in FIG. 16, the one or more containers 102 may be placed on either side of the vehicle 1500 close to, within or partially within, the location that diesel or unleaded fuel tanks typically occupy. For instance, the system 28 can be used in combination with one or more fuel tanks or in replacement of one or more fuel tanks. In embodiments with multiple containers 102, the containers 102 may have orientations that differ from one another. In embodiments with a single container 102, the container 102 may be horizontal, vertical, or slanted and may be positioned at either side of the vehicle 1500, upright, mounted along the chassis 1510 of the vehicle 1500 on either side, or mounted horizontally and transverse to the chassis 1510.

Figure 17:
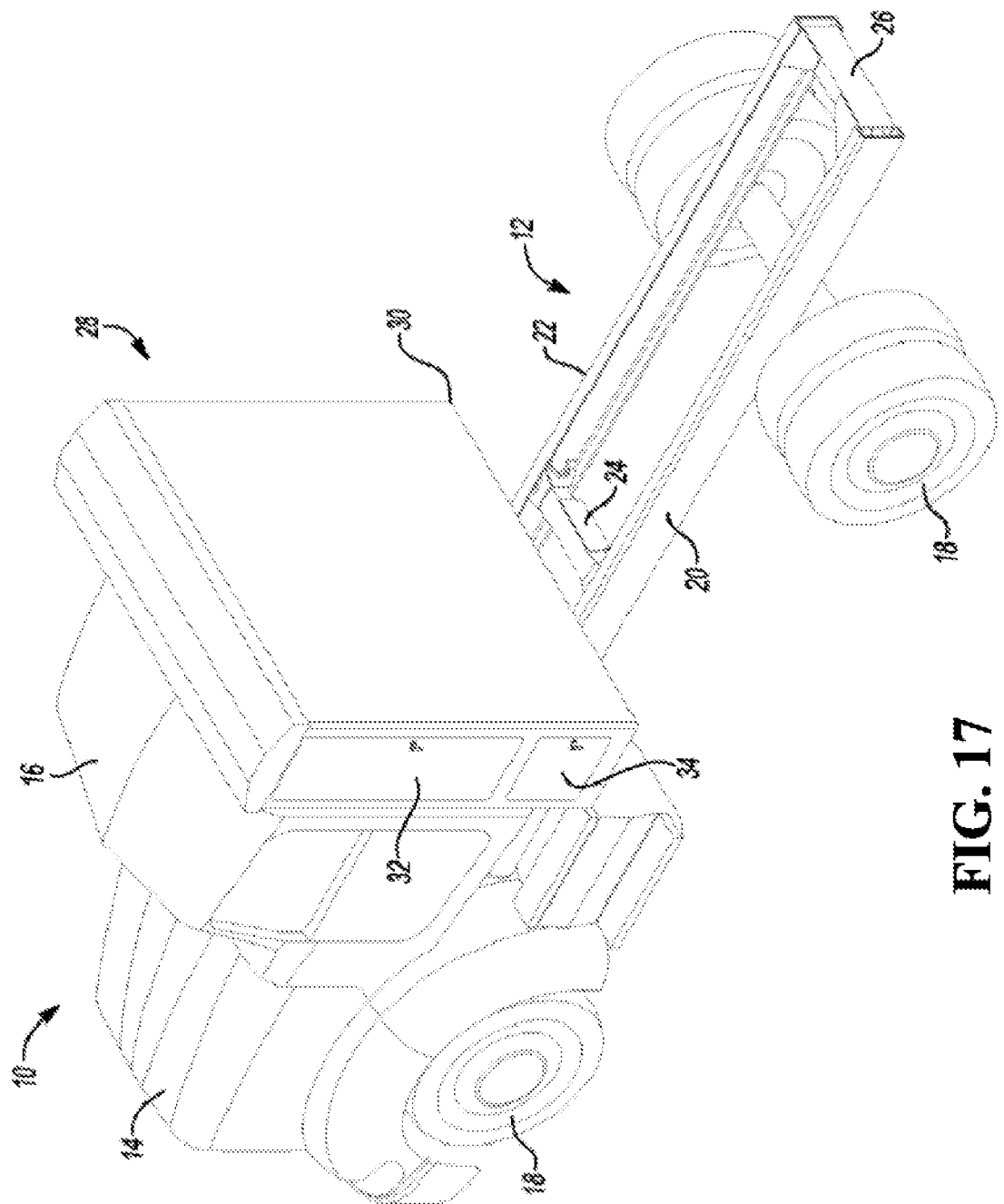
FIG. 17 is an illustration of an embodiment of a fuel storage system coupled to a vehicle that can utilize a fuel module system.

Referring to FIG. 17, the truck 10 can include a frame 12 having a front end 14, a cabin 16 and wheel tire/axle assemblies 18 attached therewith. The frame 12 can include frame rails 20, 22, which are arranged generally parallel to and spaced apart from one another, and cross members 24, 26 attached with the frame rails 20, 22 to provide structural support for the frame rails 20, 22.

A fuel storage system 28 can be supported on and attached with the frame rails 20, 22 and positioned behind the cabin 16, wherein the fuel storage system 28 can enclose one or more containers that house a material. As discussed above, the fuel storage system 28 can be a compressed gas or a material stored in a container. The fuel storage system 28 provides for the storage of a material that can be used to power movement of the truck 10. The fuel storage system 28, in this example, includes a housing 30 with access panels 32, 34. The fuel storage system 28 can have a width that is approximately equal to the width of the truck 10 so as to not significantly impact aerodynamic properties of the truck 10.

The fuel storage system 28 illustrated in FIG. 17 can include a plurality of cylindrical containers stacked on their sides such that their axes are oriented generally perpendicular to the frame rails 20, 22. In other examples, the containers may take any suitable form and be arranged in any suitable fashion.

Figure 18:
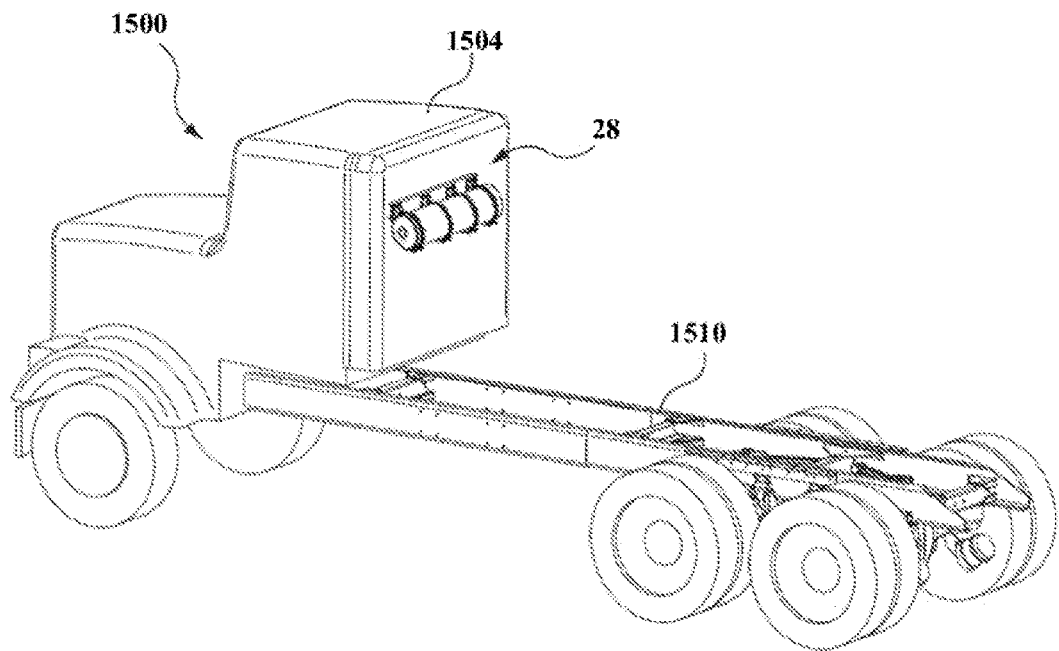
FIG. 18 is an illustration of an embodiment of a fuel storage system coupled to a vehicle that can utilize a fuel module system.
Figure 19:
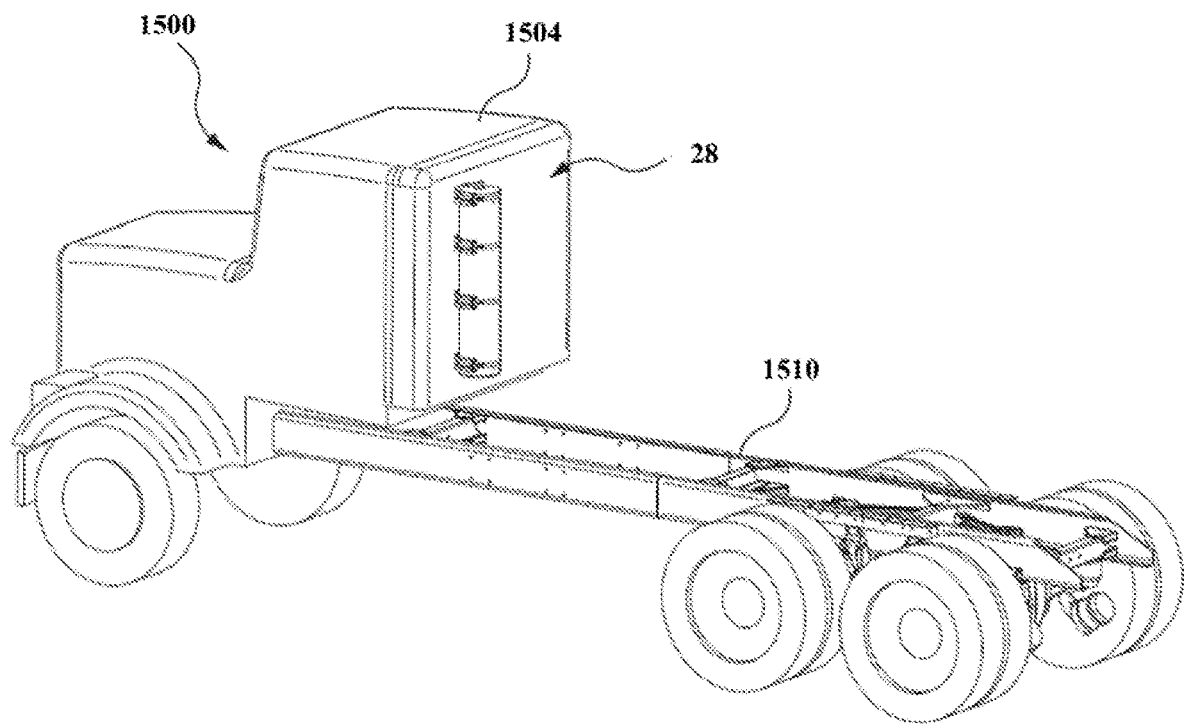
FIG. 19 is an illustration of an embodiment of a fuel storage system coupled to a vehicle that can utilize a fuel module system.
Figure 20:
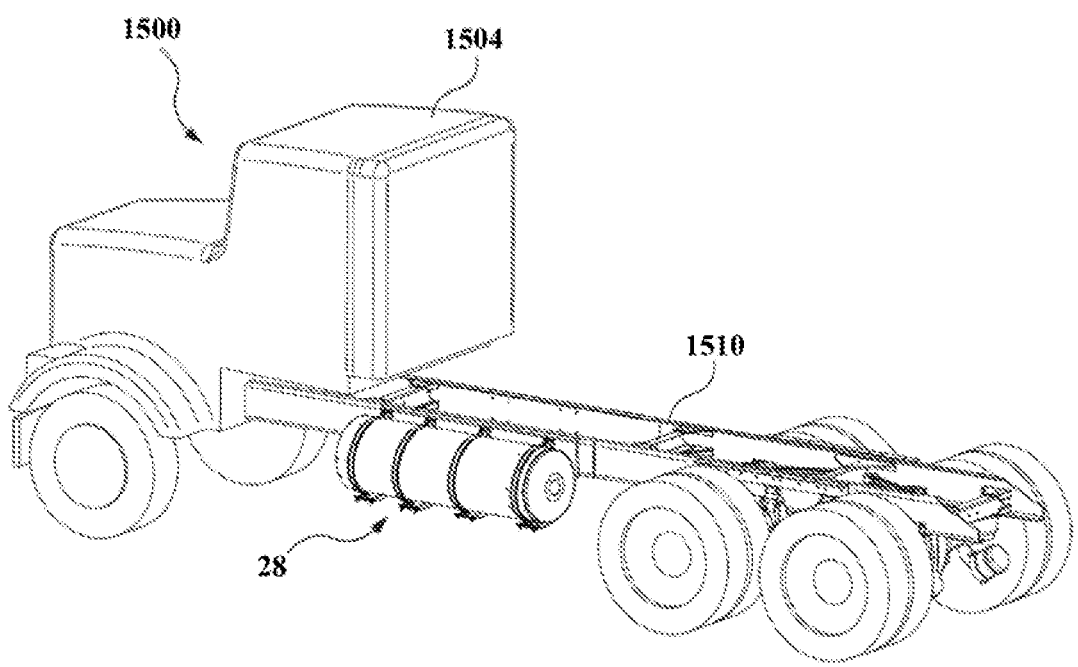
FIG. 20 is an illustration of an embodiment of a fuel storage system coupled to a vehicle that can utilize a fuel module system.

As seen in FIGS. 18-20, embodiments of fuel storage systems 28 are illustrated that can be utilized with the fuel module system 104. The fuel storage system 28 can mount to a structure on a vehicle 1500 or a portion of the vehicle 1500. In an embodiment, the fuel storage system 28 can be coupled to the chassis or frame 1510 of the vehicle 1500. For example, as shown in FIGS. 18 and 19, the fuel storage system 28 can be mounted to a portion of a cabin 1504 of the vehicle 1500 in a horizontal orientation compared to a ground level (FIG. 18). In another example, the fuel storage system 28 can be mounted to a portion of a cabin 1504 of the vehicle 1500 in a vertical orientation compared to a ground level (FIG. 19). It is to be appreciated the vehicle 1500 can include one or more fuel storage systems 28 in various configurations (e.g., a first support system in a horizontal orientation and a second support system in a vertical orientation, or a support system in a position that is in between horizontal and vertical). In another example, illustrated in FIG. 20, the fuel storage system 28 can be mounted to the chassis or frame 1510 so that the container 102 within a housing can be supported beside or beneath the frame 1510.

It should be understood that in other acceptable embodiments the orientation of the one or more containers 102 need not be horizontal; the containers 102 may be vertical or in some other orientation or position in between a horizontal position and a vertical position (e.g., an angle between 0 and 90 degrees), such as, without limitation, slanted.

In an embodiment, the container 102 can be mounted with one or more straps. In another embodiment, the container 102 can be neck mounted, that is mounted at one or more necks of the container 102. It is to be appreciated that the container 102 can include a neck 406 on at least one end of the container 102. A neck mount provides for substantially stress free container expansion and/or contraction. A neck mount may comprise a mounting block having an internal geometry adapted to engage with the neck 406 of container 102 and an external geometry adapted to engage with a block receiver. In particular, a face of the first neck mount can be coupled to the first inner plate and a face of the second neck mount can be coupled to the second inner plate.

It should be understood that the internal geometry of the mounting block can be adapted to accept a wide variety of shapes of a neck 406 including, but not limited to, cylindrical, cuboid, prismatic, polyhedral, or otherwise. It should be understood that the external geometry of the mounting block and the block receiver can be any of a wide variety of shapes including, but not limited to, cylindrical, prismatic, or otherwise. It should be understood that the fit between the neck of container 102 and the internal geometry of the mounting block may be a tight fit or press fit or other fit adapted to prevent slippage between the neck 406 and the internal geometry, or may be a loose or clearance or other fit adapted to permit slippage between the neck 406 and the internal geometry. It is further to be appreciated that a neck mount can be used on each end of the container 102 for each container 102.

In certain embodiments, the fuel module system 104 includes an electrical connector component that couples to at least one of an electrical component of the vehicle. For example, and without limitation, in conventional vehicles, there is typically an electrical system comprising one or more of an alternator or other electrical generator and a battery or other energy storage device adapted to supply electrical energy. Known methods and apparatuses for operationally engaging the electrical system of a vehicle may be adapted for use with the fuel module system 104 in order to provide an electrical connector component that may be used to readily couple with the electrical system of the vehicle. An electrical connector component coupled with the electrical system of the vehicle may be used to supply the fuel module system 104 with electrical energy, voltage, current, and the like.

In certain embodiments, the fuel module system 104 includes a fuel connector component adapted to fluidly communicate with at least one of a hose of the vehicle or a fuel line of the vehicle, wherein the fuel connector component is adapted to output a portion of the material from the one or more containers 102 to the fuel connector component and/or to the supply line or conduit. Such supply line or conduit can deliver the material from the fuel module system 104 to the engine 106 or an engine compartment using one or more of a supply line, tubing, plumbing, or conduit and/or one or more fuel connector components.

The fuel module system 104 can be located on at least one of a driver side of the vehicle or a passenger side of the vehicle. Moreover, the fuel storage system 28 illustrated in FIGS. 14-20 can include one or more manifolds. In such embodiments, the manifold can include a fast-fill port adapted to receive a portion of the material contained within one or more containers 102 at a first rate of flow; a fuel transfer port configured for fluid communication of a portion of the material between a container affixed to a second vehicle and the one or more containers 102 of the first vehicle and also configured for fluid communication of a portion of the material between the one or more containers 102 of the vehicle and an external storage container (not integral to the vehicle) such as, without limitation, a storage container at a garage, depot, or other site; and a transfer valve that is configured to control flow for the fuel transfer port. The manifold can further include a shut-off valve, an internal check valve, an inlet fitting, a fuel storage fitting, and a pressure gauge. In certain embodiments, a first container is in selectable fluid communication with a second container. This latter selectable fluid communication may be adapted for control by a valve.

Generally, a container 102 may be any kind of container chosen with good engineering judgment and may, without limitation, consist of or comprise a cylinder, a tank, a housing, or a canister. The vehicle may be any kind of vehicle chosen with good engineering judgment and may, without limitation, be selected from the group consisting of a semi, a semi-truck, a semi-trailer truck, a tractor-trailer, a transfer truck, an 18-wheeler, a truck, a class 6 vehicle, a class 7 vehicle, a class 8 vehicle, an automobile, farm equipment, industrial equipment, construction equipment, a van, a Sport Utility Vehicle (SUV), a truck that carriers a load and/or freight, a bus and the like.

The system 100 can include tubing or plumbing that delivers the material from the container 102 to the fuel module system 104, from the fuel module system 104 to an engine 106, a compartment of the engine 106, or a portion of an engine 106 of the vehicle, wherein the tubing or plumbing can utilize one or more filters, connectors, valves, regulators, sensors, transducers, solenoid valves, and the like.

The fuel module system 104 can utilize a shock mount, wherein the shock mount can be, but is not limited to being, a elastomeric damper, a spring-damper, and the like to mitigate movement and stabilize the coupling of the fuel module system 104 to a portion of the vehicle. The shock mount can include a damper with an aperture in which a bolt can be inserted therein, wherein the bolt can attach a bracket assembly to the chassis of the vehicle. The shock mount can further include a washer or plate on an end with a nut that facilitates attachment to the chassis.

Sequentially, the following occurs as illustrated in a decision tree flow diagram which is a flow diagram that processes a material from a container for delivery and use for an engine 106 of a vehicle.

A method can be provided for processing a material stored in a container 102, that includes at least the following: receiving a material having a first pressure, a first temperature, and a first flow rate from a container 102, wherein the material is used as a fuel source for an engine 106 of a vehicle; removing a contaminant from the material with a first filter 204 rated for approximately the first pressure; reducing the first pressure of the material to a second pressure, wherein the second pressure is within a target range for pressure based on a displacement of the engine 106 for the vehicle; decreasing the first temperature of the material to a second temperature, wherein the second temperature is within a target range for temperature based on the displacement of the engine 106 for the vehicle; adjusting the first flow rate of the material to a second flow rate, wherein the second flow rate is within a target range for flow rate based on the displacement of the engine 106 for the vehicle; removing an additional contaminant from the material with a second filter 206 rated for approximately the second pressure after the step of removing the contaminant; and delivering the material to a combustion chamber of the engine 106 after the step of removing the additional contaminant.

In an embodiment, the portion of the engine 106 is a combustion chamber. In an embodiment, the fuel module system includes a first sensor 508 that is configured to detect a first pressure reading for the compressed gas in the container 102, wherein the first pressure reading is utilized to ascertain an adjustment to the first pressure by the regulator 208. In an embodiment, the fuel module system 104 includes a second sensor 510 that is configured to detect a second pressure reading for the compressed gas after receipt into the inlet 222, wherein the second pressure reading is utilized to ascertain an adjustment to the first pressure by the regulator 208. In an embodiment, the fuel module system 104 includes a third sensor 512 that is configured to detect a third pressure reading for the compressed gas after the regulator 208 adjusts the compressed gas from the first pressure to the second pressure, wherein the third pressure reading is utilized to ascertain an adjustment to a pressure by the regulator 208 for a subsequent portion of material being processed by the fuel module system 104. In an embodiment, the fuel module system 104 includes a fourth sensor that is configured to detect a fourth pressure reading for the compressed gas after delivery from the outlet 224, wherein the fourth pressure reading is utilized to ascertain an adjustment to a pressure by the regulator 208 for a subsequent portion of material being processed by the fuel module system 104.

In an embodiment, the fuel module system 104 includes a temperature sensor that is further configured to detect a first temperature reading for the compressed gas in the fuel module system 104, wherein the first temperature reading is utilized to adjust the first temperature to a second temperature and the second temperature is a within a predefined range of values for the engine 106 based on a size of the engine 106 and a number of pistons of the engine 106. In an embodiment, the fuel module system 104 includes one or more lines 210 that cycle a portion of liquid through a body surrounding a portion of the gas path to adjust the compressed gas from the first temperature to the second temperature. In an embodiment, the fuel module system 104 includes a flow rate sensor that is further configured to detect a first flow rate reading for the compressed gas in the fuel module system 104, wherein the first flow rate reading is utilized to adjust the first flow rate to a second flow rate with the regulator 208 and the second flow rate is a within a predefined range of values for the engine 106 based on a size of the engine 106 and a number of pistons of the engine 106.

In an embodiment, the fuel module system 104 includes the following: a first sectional module 502 that includes the first filter 204, the regulator 208, the inlet 222, and a first portion of the gas path 606; a second sectional module 504 that includes the second filter 206, a second portion of the gas path 606', and the outlet 224, wherein the first portion of the gas path 606 and the second portion of the gas path 606' are in fluid communication with one another; and the first sectional module 502 and the second module 504 are removeably coupled.

In an embodiment, the first filter 204 removes contaminants for a first pressure that is above 3100 psi. In an embodiment, the first filter 204 removes contaminants for a second pressure that is below 100 psi.

In an embodiment, the fuel module system 104 includes a purge component 220 that activates a flow of the material through the second filter 206 to cleanse and remove debris therefrom and restrains passage of the material to the outlet 224. In an embodiment, the fuel module system 104 includes a containment vessel 302 that collects and stores the flow of the material through the second filter 206.

In an embodiment, the fuel module system 104 includes a first sectional module 502 that includes the first filter 204, the regulator 208, and the inlet 222; a second sectional module 504 that includes the second filter 206, and the outlet 224; and the first sectional module 502 and the second module 504 are removeably coupled.

In an embodiment, the fuel module system 104 includes at least one of: an additional pressure sensor that detects pressure after the second filter 206 removes contaminants; an additional temperature sensor that detects temperature after the second filter 206 removes contaminants; and an additional flow rate sensor that detects flow rate after the second filter 206 removes contaminants.

In an embodiment, the fuel module system 104 includes: the regulator 208 further adjusts pressure of the material dependent upon the additional pressure sensor data detected; the regulator 208 further adjusts flow rate of the material dependent upon the additional flow rate sensor data detected; and one or more lines 210 further adjusts temperature of the body of the fuel module system 104 dependent upon the additional temperature sensor data detected.

In an embodiment, the fuel module system 104 includes: a purge component 220 that activates a flow of the material through the second filter 206 to cleanse and remove debris therefrom and restrains passage of the material to the outlet 224; and a containment vessel 302 that collects and stores the flow of the material through the second filter 206.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the subject matter, including the best mode, and also to enable one of ordinary skill in the art to practice the invention, including making and using devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A fuel module interposed between an engine and a container storing a compressed gas, comprising:
    a wireless communication component operably coupled to an associated external network that is external to a vehicle having the fuel module;
    an inlet via which the fuel module is coupled to the container, the inlet receives compressed gas from the container at a first pressure, a first temperature, and a first flow rate;
    a first filter in fluid communication with the inlet, the first filter is configured to filter the compressed gas at the first pressure, the first temperature, and the first flow rate;
    a regulator in fluid communication with the first filter, the regulator is configured to adjust the compressed gas from the first pressure to a second pressure lower than the first pressure after the compressed gas is filtered, and from the first flow rate to a second flow rate;
    a first flow rate sensor configured to measure the first flow rate;
    a second flow rate sensor configured to measure the second flow rate;
    an electric heater configured to adjust the compressed gas from the first temperature to a second temperature within a target range associated with the engine and the real-time condition of the engine;
    a temperature sensor configured to output a first temperature reading for the compressed gas within the fuel module, wherein the adjustment of the compressed gas from the first temperature to the second temperature is based at least in part on the first temperature reading and the temperature sensor configured to detect the second temperature;
    a second filter in fluid communication with the regulator, the second filter is configured to filter compressed gas at the second pressure, the second temperature, and the second flow rate; and
    an outlet via which the fuel module is coupled to the engine, the outlet delivers the compressed gas from the second filter to the engine at the second pressure, the second temperature, and the second flow rate, wherein the second pressure, the second temperature, and the second flow rate are adjusted in real-time based on readings from a memory of the vehicle, wherein the memory stores the target range.

2. The fuel module of claim 1, further comprising a first sensor configured to output a first pressure reading for the compressed gas in the container, wherein the real-time adjustment of the first pressure to the second pressure is based at least in part on the first pressure reading from the first sensor.

3. The fuel module of claim 1, further comprising a second sensor configured to output a second pressure reading for the compressed gas at the inlet, wherein the real-time adjustment of the first pressure to the second pressure is based at least in part on the second pressure reading from the second sensor.

4. The fuel module of claim 1, further comprising a third sensor configured to output a third pressure reading for the compressed gas output from the regulator, wherein the real-time adjustment of the first pressure to the second pressure is based at least in part on the third pressure reading from the third sensor.

5. The fuel module of claim 1, further comprising a fourth sensor configured to detect a fourth pressure reading for the compressed gas at the outlet, wherein the real-time adjustment of the first pressure to the second pressure is based at least in part on the fourth pressure reading from the fourth sensor.

6. The fuel module of claim 1, further comprising the first flow rate sensor configured to output a first flow rate reading for the compressed gas within the fuel module, wherein the real-time adjustment of the first flow rate to the second flow rate is based at least in part on the first flow rate reading from the first flow rate sensor.

7. The fuel module of claim 1, wherein the fuel module comprises a set of sectional modules removeably coupleable together, the set of sectional modules includes:
a first sectional module having the first filter, the regulator, and the inlet; and
a second sectional module having the second filter and the outlet,
wherein a gas path is formed between the first sectional module and the second sectional module when coupled, the gas path directs flow between the first sectional module and the second sectional module.

8. The fuel module of claim 1, wherein the first filter is a high pressure filter configured to filter a fluid having a pressure above 3100 psi, and
wherein the second filter is a low pressure filter configured to filter a fluid having a pressure below 100 psi.

9. The fuel module of claim 1, further comprising a purge component configured to redirect fluid flow through the second filter to a containment vessel to clean the second filter.

10. A fuel module connected between an engine and a container storing a compressed gas used as an alternative fuel for a vehicle, comprising:
a wireless communication component operably coupled to an associated external network that is external to the vehicle;
an inlet via which the fuel module receives the compressed gas from the container at a first pressure, a first temperature, and a first flow rate;
an inlet pressure sensor that outputs an inlet pressure reading for the compressed gas at the inlet; a container pressure sensor that outputs a container pressure reading for the compressed gas in the container;
a fuel module temperature sensor that outputs a fuel module temperature reading for the compressed gas within the fuel module;
a first fuel module flow sensor that outputs a fuel module flow rate reading of the compressed gas within the fuel module, wherein the fuel module flow sensor is configured to measure the first flow rate;
a second fuel module flow sensor that outputs a fuel module flow rate reading of the compressed gas within the fuel module, wherein the fuel module flow sensor is configured to measure a second flow rate;
a regulator configured to adjust the compressed gas from the first pressure to a second pressure lower than the first pressure, and from the first flow rate to the second flow rate;
an electric heater configured to adjust the compressed gas from the first temperature to a second temperature within a target range associated with the engine and the real-time condition of the engine and the fuel module temperature sensor configured to detect the second temperature;
an entry filter configured to remove contaminants from the compressed gas prior to entry to the regulator;
an exit filter configured to remove contaminants from the compressed gas after exiting the regulator; and
an outlet via which the fuel module delivers the compressed gas to the engine of the vehicle at the second pressure, the second temperature, and the second flow rate,
wherein the second pressure, the second temperature, and the second flow rate are adjusted in real-time based on readings from a memory of the vehicle, wherein the memory stores the target range.

11. The fuel module of claim 10, further comprising:
a first sectional module that includes the inlet filter, the regulator, and the inlet; and
a second sectional module that includes the exit filter, and the outlet,
wherein the first sectional module and the second module are removeably coupled together.

12. The fuel module system of claim 10, further comprising an outlet pressure sensor that outputs an outlet pressure reading for the compressed gas at the outlet.

13. The fuel module of claim 12, wherein the second pressure and the second flow rate are adjusted in real-time further based at least in part on one or more of the inlet pressure reading from the inlet pressure sensor, the container pressure reading from the container pressure sensor, the outlet pressure reading from the outlet pressure sensor, or the fuel module flow rate readings from the first and second fuel module flow sensors.

14. The fuel module of claim 10, further comprising:
a purge component configured to redirect a fluid flow through the exit filter to a containment vessel to clean the exit filter.

15. The fuel module of claim 10, wherein the second pressure, the second temperature, and the second flow rate are adjusted in real-time further based on the inlet pressure reading, the container pressure reading, the fuel module temperature reading, and the fuel module flow rate reading.

* * * * *